US008792388B2

(12) United States Patent
Yamato et al.

(10) Patent No.: US 8,792,388 B2
(45) Date of Patent: Jul. 29, 2014

(54) NETWORK SYSTEM, CONTROLLER, METHOD AND PROGRAM

(75) Inventors: Junichi Yamato, Tokyo (JP); Kazuya Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 93 days.

(21) Appl. No.: 13/067,847

(22) Filed: Jun. 29, 2011

(65) Prior Publication Data
US 2011/0261723 A1 Oct. 27, 2011

Related U.S. Application Data

(63) Continuation of application No. PCT/JP2010/067554, filed on Oct. 6, 2010.

(30) Foreign Application Priority Data

Oct. 6, 2009 (JP) ................................. 2009-232306

(51) Int. Cl.
H04L 12/28 (2006.01)

(52) U.S. Cl.
USPC ........................................................ 370/255

(58) Field of Classification Search
None
See application file for complete search history.

(56) References Cited

U.S. PATENT DOCUMENTS

| 5,138,657 A * | 8/1992 | Colton et al. ............ 379/220.01 |
| 6,643,254 B1 | 11/2003 | Kajitani et al. |
| 7,606,237 B2 * | 10/2009 | Dziong et al. ............ 370/395.41 |
| 8,160,056 B2 * | 4/2012 | Van der Merwe et al. .... 370/351 |
| 2003/0185148 A1 | 10/2003 | Shinomiya et al. |
| 2004/0202112 A1 * | 10/2004 | McAllister et al. ............ 370/252 |
| 2007/0223368 A1 * | 9/2007 | Ozaki ............................. 370/216 |
| 2008/0049622 A1 * | 2/2008 | Previdi et al. ................. 370/237 |
| 2008/0205269 A1 * | 8/2008 | Kitamura et al. ........... 370/230.1 |
| 2009/0037771 A1 * | 2/2009 | Morse et al. ..................... 714/25 |

FOREIGN PATENT DOCUMENTS

| JP | 2000-59374 A | 2/2000 |
| JP | 2001-237889 A | 8/2001 |
| JP | 2001-345810 A | 12/2001 |
| JP | 2003-289325 A | 10/2003 |

OTHER PUBLICATIONS

Nick McKeown et al., "OpenFlow: Enabling Innovation in Campus Networks", Mar. 14, 2008 <Internet URL: http://www.openflowswitch.org//documents/openflow-wp-latest.pdf>.

"OpenFlow Switch Specification" Version 0.9.0 (Wire Protocol 0x98) Jul. 20, 2009 <Internet URL: http://www.openflowswitch.org/documents/openflow-spec-v0.9.0.pdf>.

* cited by examiner

Primary Examiner — Dang Ton
Assistant Examiner — Ronald H Davis
(74) Attorney, Agent, or Firm — McGinn IP Law Group, PLLC

(57) ABSTRACT

A controller removes a node to be bypassed from topology information that prescribes the network configuration and calculates a new path not passing the bypass node. For the nodes that form the path, the controller creates flow information that prescribes operation on the flow at nodes to set the flow information at the nodes on the path.

36 Claims, 27 Drawing Sheets

FIG. 25    RELATED ART

| | MAC DA | |
|---|---|---|
| MAC DA | | |
| MAC SA | | |
| MAC SA | | TPID(81-00) |
| VLAN ID | | TYPE |
| Ver/IHL | ToS | Total Length |
| Identification | | Flag/Frag Offset |
| TTL | Protocol | CheckSum |
| IP SA | | |
| IP DA | | |
| Source Port | | Destination Port |
| Sequence Number | | |
| Acknowledgment Number | | |
| Offset / Flags | | Window Size |
| CheckSum | | Urgent Pointer |
| Payload Data | | |

FIG. 26  RELATED ART

| ACTION NAMES | CONTENTS OF ACTIONS |
|---|---|
| OUTPUT | OUTPUT TO SPECIFIED PORT |
| SET_VLAN_VID | ADD AND UPDATE VLAN Tag WITH SPECIFIED VLAN ID |
| SET_VLAN_PCP | ADD AND UPDATE VLAN Tag WITH SPECIFIED VLAN PRIORITY |
| STRIP_VLAN | REMOVE IEEE802.1q VLAN Tag |
| SET_DL_SRC | UPDATE MAC SA |
| SET_DL_DST | UPDATE MAC DA |
| SET_NW_SRC | UPDATE IP SA |
| SET_NW_DST | UPDATE IP DA |
| SET_TP_SRC | UPDATE TCP/UDP SOURCE PORT |
| SET_TP_DST | UPDATE TCP/UDP DESTINATION PORT |
| VENDOR | VENDOR DEFINITION ACTION |

FIG. 27  RELATED ART

| NAMES OF VIRTUAL PORTS | MEANING |
|---|---|
| IN_PORT | MEANS PORT THAT RECEIVED PACKET |
| NORMAL | REMOVE PACKET FROM CONTROL BY OPENFLOW AND DELIVER IT TO PRE-EXISTING PROTOCOL PROCESSING (BRIDGE OR IP FORWARDING) |
| FLOOD | ALL PORTS IN THE FORWARDING STATE OTHER THAN PORT THAT RECEIVED PACKET |
| ALL | ALL PORTS OTHER THAN PORT THAT RECEIVED PACKET |
| CONTROLLER | ADDRESSED TO CONTROLLER VIA SECURE CHANNEL |
| LOCAL | SWITCH ITSELF GOES TO NETWORK STACK (= TO SOCKET) | ial Patent
NETWORK SYSTEM, CONTROLLER, METHOD AND PROGRAM

CROSS REFERENCES TO RELATED APPLICATIONS

This application is a continuation of International Patent Application No. PCT/JP2010/067554, filed on Oct. 6, 2010, and claims priority to Japanese Patent Application No. 2009-232306 filed in Japan on Oct. 6, 2009, both of which are incorporated herein by reference in their entireties.

This invention relates to a network system, a controller, a method and a program.

TECHNICAL FIELD

Background

OFS (OpenFlow Switch), which may be said to be at the forefront of a programmable network architecture, is now under study for experimentation and practical utilization in university campuses or enterprise networks. OFS is initially briefly explained. The switch (OSF switch) includes a flow table for packet lookup and forwarding and a secure channel for communication with a controller. The controller has communication with the switch over a secure channel, using an OpenFlow protocol, and controls the flow on an API (Application Program Interface) level, for example. If a first packet has arrived at a switch, the switch retrieves the flow table using header information of the packet. In case of non-match (mis-hit), the switch forwards the packet to the controller over the secure channel. Based upon information on a source and a destination of the packet, the controller decides on a path for the packet from the network topology information managed by the controller. Based upon the path, thus decided on, the controller decides on a flow table for each switch on the path. The second and the following packets hit the flow tables of the switches and are not forwarded to the controller but are directly forwarded to the next switch prescribed by the entries on the flow tables. As for details of the OFS, inclusive of the following brief-explanation, reference may be made to Non-Patent Documents 1 and 2, for example.

The flow table of the switch includes a rule (Rule) that is to be matched to a packet header, an action (Action) that defines the processing to be performed on each flow and flow statistic information (Statistics), from each flow, as shown in FIG. 24. Exact values and wildcards are used for the rule (Rule) that is matched to the packet header. The Action denotes an action applied to the packet that matches with the rule. The flow statistics information, also termed an activity counter, includes the number of active entries, number of times of packet lookup, the number of packet matches. The flow statistics information also includes, for each flow, the number of packets received, the number of bytes received, and the time duration of active flow. The flow statistics information also includes, for each port, the numbers of reception packets, transmission packets, reception bytes, transmission bytes, reception drops, transmission drops, reception errors, transmission errors, reception frame alignment errors, reception overrun errors, reception CRC (Cyclic Redundancy Check) errors and the number of collisions. The packet received by the switch is matched to the rule of the flow table. If an entry matched to the rule is found, the action of the matched entry is performed for the packet. If no matched entry is found, the packet is forwarded over the secure channel to the controller. The controller sends a flow entry on which a path for the packet has been decided. The switch adds, changes or deletes the flow entry in the flow table of the said switch.

A preset field of the packet header is used for match to the rule of the flow table of the switch. The information used for match includes an input port (Ingress Port), MAC (Media Access Control), DA (MAC Destination Address), MAC SA (MAC Source Address), Ethernet type (TPID), VLAN ID (Virtual LAN (Local Area Network) ID), VLAN TYPE (degree of priority), IP SA (IP source address), IP DA (IP destination Address), IP protocol, Source Port (TCP (Transmission Control Protocol)/UDP (User Datagram Protocol), Source port or ICMP (Internet Control Message Protocol Type) and Destination port (TCP/UDP destination port or ICMP Code) (see FIG. 25).

FIG. 26 shows examples of action names and contents of actions. OUTPUT means outputting at a specified port (interface). SET_VLAN_VID down to SET_TP_DST mean actions for correcting the fields of the packet header. The switch forwards a packet to a physical port and to the following virtual ports. FIG. 27 illustrates the virtual ports. IN_PORT outputs the packet to an input port. Normal means processing a packet using a pre-existing forwarding path supported by the switch. FLOOD means forwarding the packet to all ports in the communication enabled state (Forwarding state) except the port from which the packet was delivered. ALL means forwarding the packet to the ports except the port from which the packet was delivered. Controller encapsulates the packet to send it to a controller over the secure channel. LOCAL sends the packet to the local network stack of the switch itself. The packet that has matched to the flow entry where no action has been specified is dropped (discarded). In the present specification, the flow information composed of the rule and the action as well as the flow statistics information of the flow entry is termed the 'flow entity'. In the present specification, the flow statistics information is not treated as the subject matter of the invention, and hence is omitted in the flow entity, which is thus shown to be comprised of the rule and the action.

[Non-Patent Document 1]
Nick McKeown et al., "OpenFlow: Enabling Innovation in Campus Networks", Mar. 14, 2008 <Internet URL: http://www.openflowswitch.org//documents/openflow-wp-latest.pdf>

[Non-Patent Document 2]
"OpenFlow Switch Specification" Version 0.9.0 (Wire Protocol 0x98) Jul. 20, 2009 <Internet URL: http://www.openflowswitch.org/documents/openflow-spec-v0.9.0.pdf>

SUMMARY

The entire disclosure disclosed in the Non-Patent Documents 1 and 2 is incorporated in the present specification by reference. The following analysis is from the side of the present invention. In a network where each node is controlled by a controller to decide on a path, as in the OFS, it may sometimes occur that any one of the nodes becomes unusable due to defect or maintenance. For such case, it may be desirable to implement a system so that a path that bypasses the node will be able to be set. By having a preset node bypassed in the network, paths may be put aside, thus allowing for decreasing the power consumption. The system of the present invention provides for implementation of such a system.

In one aspect of the present invention, there is provided a network system comprising: a controller; and a plurality of nodes, a flow at each of which is controlled by the controller, wherein the controller removes a node commanded to be bypassed from a topology information that prescribes a network configuration of the plurality of nodes, calculates a new path not passing the node commanded to be bypassed, creates flow information that prescribes operation, at each of nodes forming the new path, on an associated flow, and sets the flow information in each of the nodes on the new path.

In another aspect of the present invention, there is provided a network control method comprising a controller that exercises flow control on a plurality of nodes, removing a node commanded to be bypassed from a topology information that prescribes a network configuration of the plurality nodes;

the controller calculating a new path not passing the node commanded to be bypassed;

the controller creating flow information that prescribes operation, at each of nodes forming the new path, on an associated flow; and the controller setting the flow information in each of the nodes on the new path.

In a further aspect of the present invention, there is provided a controller that exercises flow control on a plurality of nodes, wherein the controller removes a node commanded to be bypassed from topology information that prescribes a network configuration of the plurality nodes, calculates a new path not passing the node commanded to be bypassed to store the new path calculated in a valid path memory, creates flow information that prescribes operation, at each of nodes forming the new path, on an associated flow, and sets the flow information in each of the nodes on the new path.

In yet another aspect of the present invention, there is provided a program that causes a computer that constitutes a controller exercising flow control for a plurality of nodes to execute the processing comprising:

removing a node commanded to be bypassed from topology information that prescribes a network configuration of the plurality nodes;

calculating a new path not passing said node commanded to be bypassed to store said new path calculated in a valid path memory;

creating flow information that prescribes operation, at each of nodes forming said new path, on an associated flow; and setting said flow information in each of said nodes on said new path. According to the present invention, there is also provided a computer-readable recording medium that stores said program therein.

According to the present invention, such a path that does not pass a node commanded to be bypassed is calculated and set, whereby it is possible to bypass the said node to allow for performing maintenance operation for the said node or the like. Moreover, according to the present invention, paths may be put aside by node bypassing, thereby making it possible to decrease power consumption.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 25 is a diagram for explaining a match field of a packet header.

FIG. 26 is a diagram for explaining an action (Field Modify) of a flow entity.

FIG. 27 is a diagram for explaining an action (virtual port) of the flow entity.

PREFERRED MODES

The following describes exemplary embodiments of the present invention. A system according to the present invention includes a controller and a plurality of nodes (switches 10 of FIG. 1). A flow of each node is controlled by the controller (20). The controller (20) removes a node which is commanded to be bypassed from topology information that prescribes a network configuration of nodes. The controller (20) calculates a new path not passing the said node. The controller (20) creates flow information that prescribes operation of nodes forming the new path to the flow, and sets flow information at the nodes on the new path. In the exemplary embodiments, the nodes which have flows controlled by the controller (20) are assumed to be switches. However, in the present invention, the nodes are not limited to this configuration.

<Network System Configuration>

Figure 1:
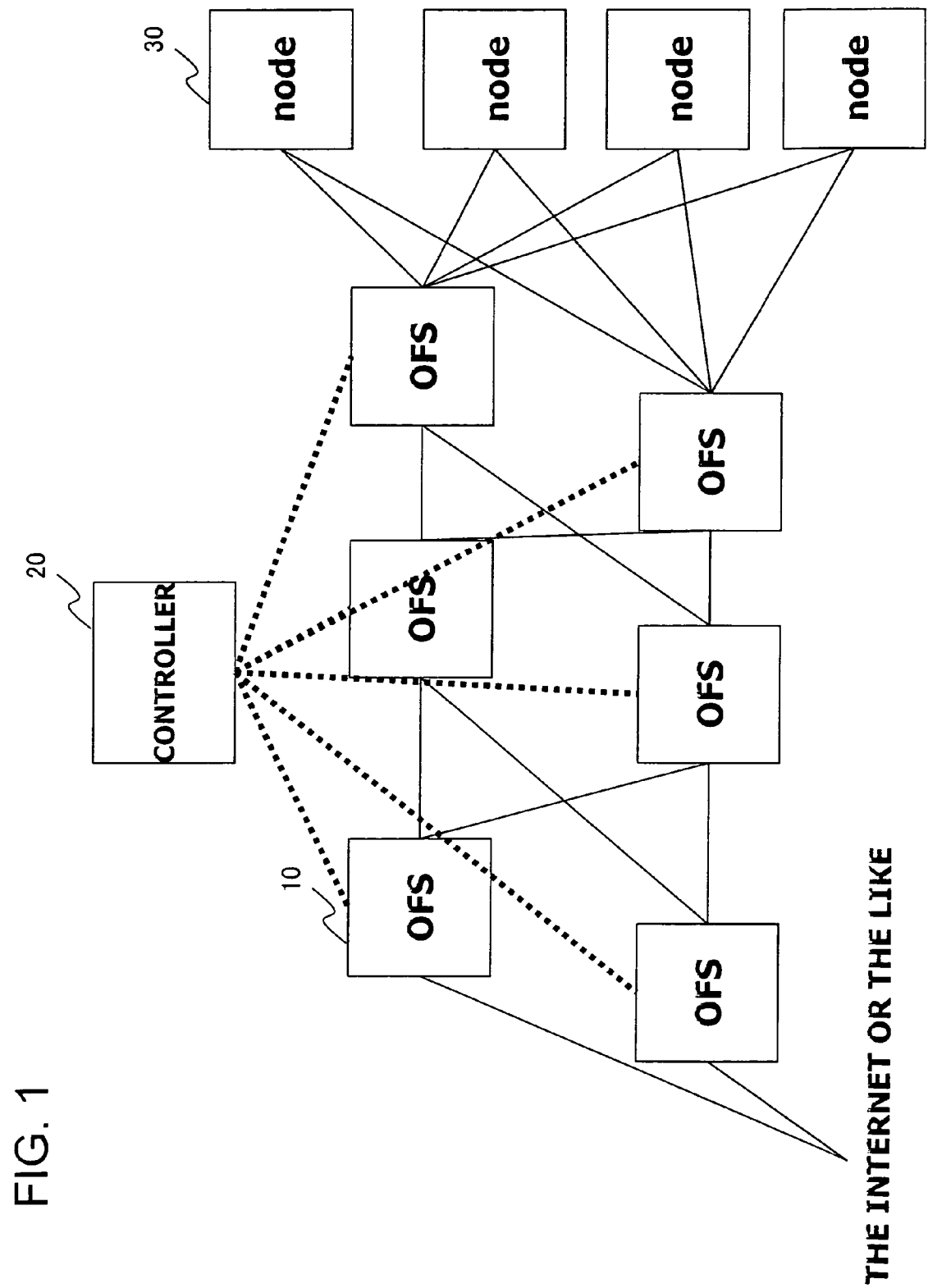
FIG. 1 is a diagram showing an example configuration of a network system according to an exemplary embodiment of the present invention.

FIG. 1 shows an example network to which the present invention is applied. Referring to FIG. 1, each switch (OFS: Open Flow Switch) 10 holds flow information as set from a controller 20. The flow information, including a rule and an action, is referred to below as a 'flow entity'. The switch (OFS) 10 retrieves a rule, relevant to an incoming packet, from a flow entity table (flow table) held by the switch 10. In case the incoming packet matches to a rule, the switch 10 performs an action associated with the rule. In case the incoming packet does not match to any rule in the flow entity table, the switch (OFS) 10 sends the packet to the controller 20 by way of a notification that the said packet is the first packet. The flow has priority of different values such that a flow with a higher value of priority is held to be valid. The controller 20 calculates a proper path for the packet sent from the switch (OFS) 10, and creates flows to set the flows in the switches. In FIG. 1, the connection configuration of the switches (OFS) 10 is merely illustrative such that it suffices that there exist a plurality of paths, such as FatTree, HyperCubea and so forth, to the nodes. In FIG. 1, nodes 30 are not flow-controlled from the controller 20 that exercises flow control on the multiple switches 10. Each of the nodes 30 has two or more network interfaces, such as server, load balancer, firewall, storage (NAS (Network Attached Storage)), SAN (Storage Area Network) or, node of distributed storage such as cluster storage isilon. The node 30 may, as a matter of course, be equipped with the function of communicating with the controller 20. In FIG. 1, the one controller 20 controls switches 10. However, it is of course possible for each of multiple controllers to control one or more of switches under its supervision.

In the present exemplary embodiment, the controller 20 holds the connection state of the switches 10 as the topological information.

The controller 20 holds the path information, which has been set for the packet, as valid path information. That is, the controller 20 determines a flow for a packet (first packet) which has been entered to the switch 10 and whose header information is not matched to the rule of the flow entity and sends a flow entity to switches on the flow. The switches set the flow entity. The controller 20 manages and holds the path information corresponding to the flow as the valid path information.

The following describes the bypass procedure in the present exemplary embodiment. If, in FIG. 1, a specific switch (OFS) 10 is to be by-passed, the controller 20 calculates, for the total of paths passing the switch to be bypassed (old paths), a new path not passing the switch to be bypassed. This switch to be bypassed is referred to as 'bypass switch'. The controller 20 sets a flow entity for each of the switches located on the new path. The following outlines the bypass sequence.

<Bypass 1>

1. In case a bypass switch is specified, the controller 20 deletes the so specified bypass switch from the topological information the controller 20 holds.

2. The controller 20 re-calculates, for the total of paths passing the switch to be bypassed (old paths), a new path not passing the switch to be bypassed, and sets a flow entity for each of the switches on the new path. The controller 20 determines a flow for each of the switches that compose the new path, and stores the new path information as valid path information.

3. The controller 20 sets the flow entity corresponding to the so determined flow, in the relevant switches.

4. The controller 20 deletes the old path (a path passing the switch to be bypassed) from the valid path information.

5. The controller 20 issues notification of the completion of preparation for bypassing.

In the present exemplary embodiment, the controller 20, one receipt of information on the switch to be bypassed, deletes the switch to be bypassed from the topological information. In calculating a bypass path, the controller 20 uses the topological information which does not includes the switch.

The new and old paths may be allowed to transiently co-exist to form a redundant network. The packet may then be replicated. The following describes bypass procedure for such a case.

<Bypass 2>

1. On receipt of the information on switches to be bypassed, the controller 20 removes the switch to be bypassed (bypass switch) from the topological information 2. For the entirety of the paths that use the specified bypass switch, the controller 20 calculates the bypass paths (new paths) not passing the bypass switch, and determines a flow for each of the switches that form each path.

3. The controller 20 sets a flow entity in a switch relevant to the flow calculated. At the leading switch where the new and old paths bifurcate, the controller 20 sets the packet so that the packet will be sent on both the new and old paths, and stores the new path information as valid path information.

4. The controller 20 deletes the old path from the valid path information. The controller 20 deletes the old path. At this time, the controller 20
  sequentially deletes the flow from the leading end switch on the old path; and
  when the flow has been deleted from the leading end switch, replication setting of a packet in the leading end switch is released (change of the action setting in the flow entity).

5. A notification of the completion of preparation for bypassing is issued.

A tunnel may also be used as a bypass path. The tunnel means encapsulating data of the same layer or a lower layer and transparently transmitting it without protocol termination.

The controller 20 creates a tunnel between switches neighboring to the switch to be bypassed, and flows set for switches other than the neighboring switches on the path are used unchanged. A bypass path is created by changing the flows set in the neighboring switches to a flow that guides to the above mentioned tunnel. By-passing by the tunnel is carried out substantially as follows:

<Tunnel>

1. The controller 20 calculates a path that has switches "a" and "b" neighboring to the bypass switch as termination points.

2. The controller 20 creates flows matched to input/output ports of switches located on a path having, as termination points, the neighboring switches "a" and "b" created in 1.

3. The controller 20 sets switches of the flows created in 2. above as a tunnel. The switches that compose the tunnel are preferably set to a priority of a value lower than that of the remaining switches. The flows set, other than the flows for neighboring switches, are used unchanged.

4. For the flows that send data from the neighboring switch "a" to the neighboring switch "b" via the bypass switch, the controller 20 sets flows in the neighboring switches "a" and "b" so that data will be guided to the above mentioned path created in 1 above and having the neighboring switches "a" and "b" as termination points.

Figure 2:
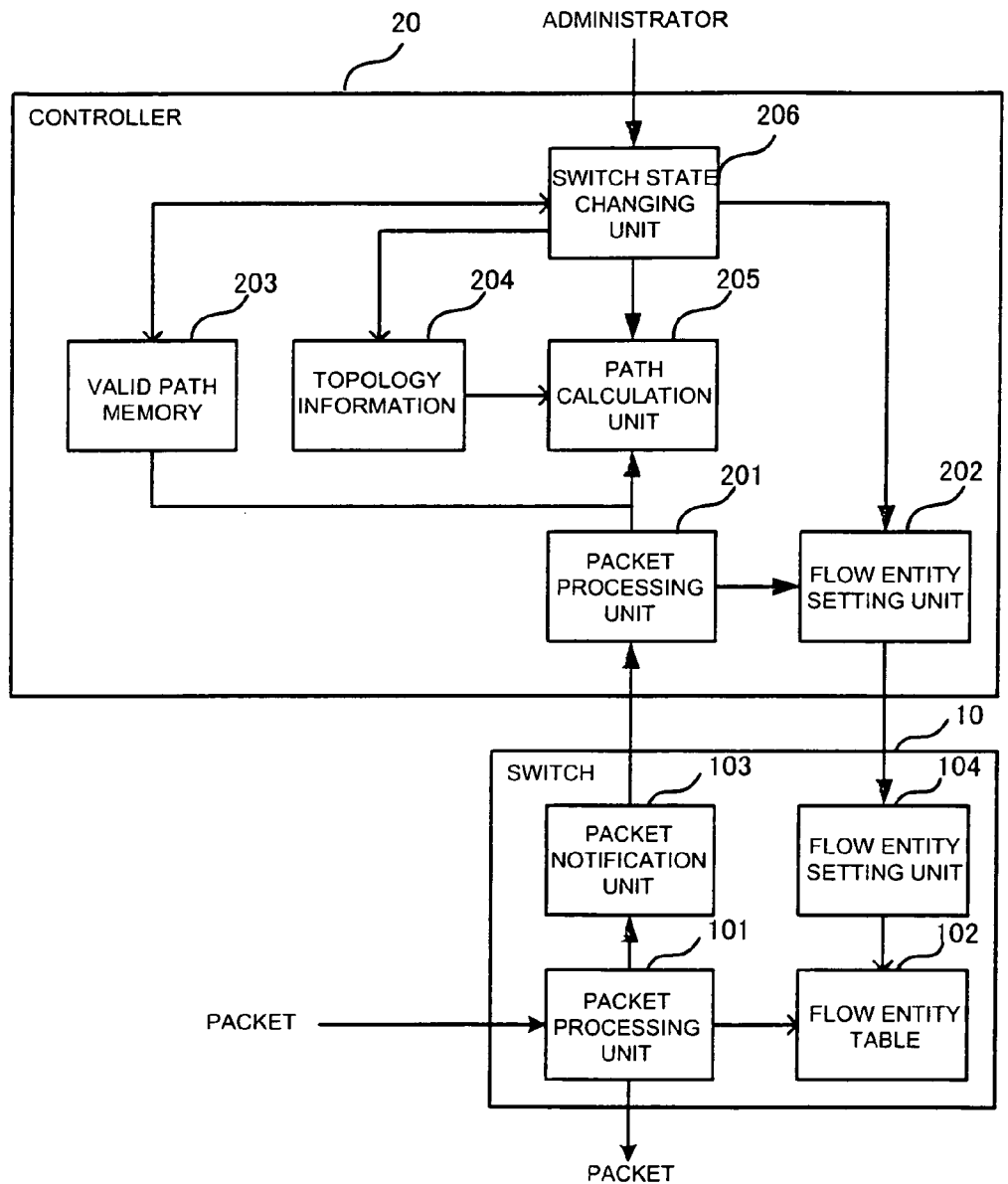
FIG. 2 is a block diagram showing an example configuration of a controller and a switch according to an exemplary embodiment of the present invention.

An exemplary embodiment of the present invention will now be explained. Referring to FIG. 2, the switch 10 may have communication with the controller 20 that controls it. The controller 20 controls one or more switches 10.

<Configuration Example of Controller>

The controller 20 includes a packet processing unit 201 that receives a packet from the switch 10, a flow entity setting unit 202 that sets a flow entity for the switch 10, a valid path memory 203 that holds the path configuration information, and topology information 204 that stores the network topology of nodes and switches. The path configuration information includes information on a switch that receives a packet that acts as a trigger to create a path, information on a header of the packet, information for identifying the switches composing the path, and corresponding flow entities. The controller 20 further includes a path calculation unit 205 that calculates a path and a switch state changing unit 206 that changes a state of the switch.

<Configuration Example of Switch>

The switch 10 includes a packet processing unit 101, a flow entity table 102, also termed a flow table 102, a packet notification unit 103 that notifies the controller 20 of the first packet and a flow entity setting unit 104 that sets a flow entity as commanded by the controller 20. The switch 20 that may have its switching function controlled by the controller, such as a layer 2 switch, a layer 3 switch or a router, may be used.

Figure 24:
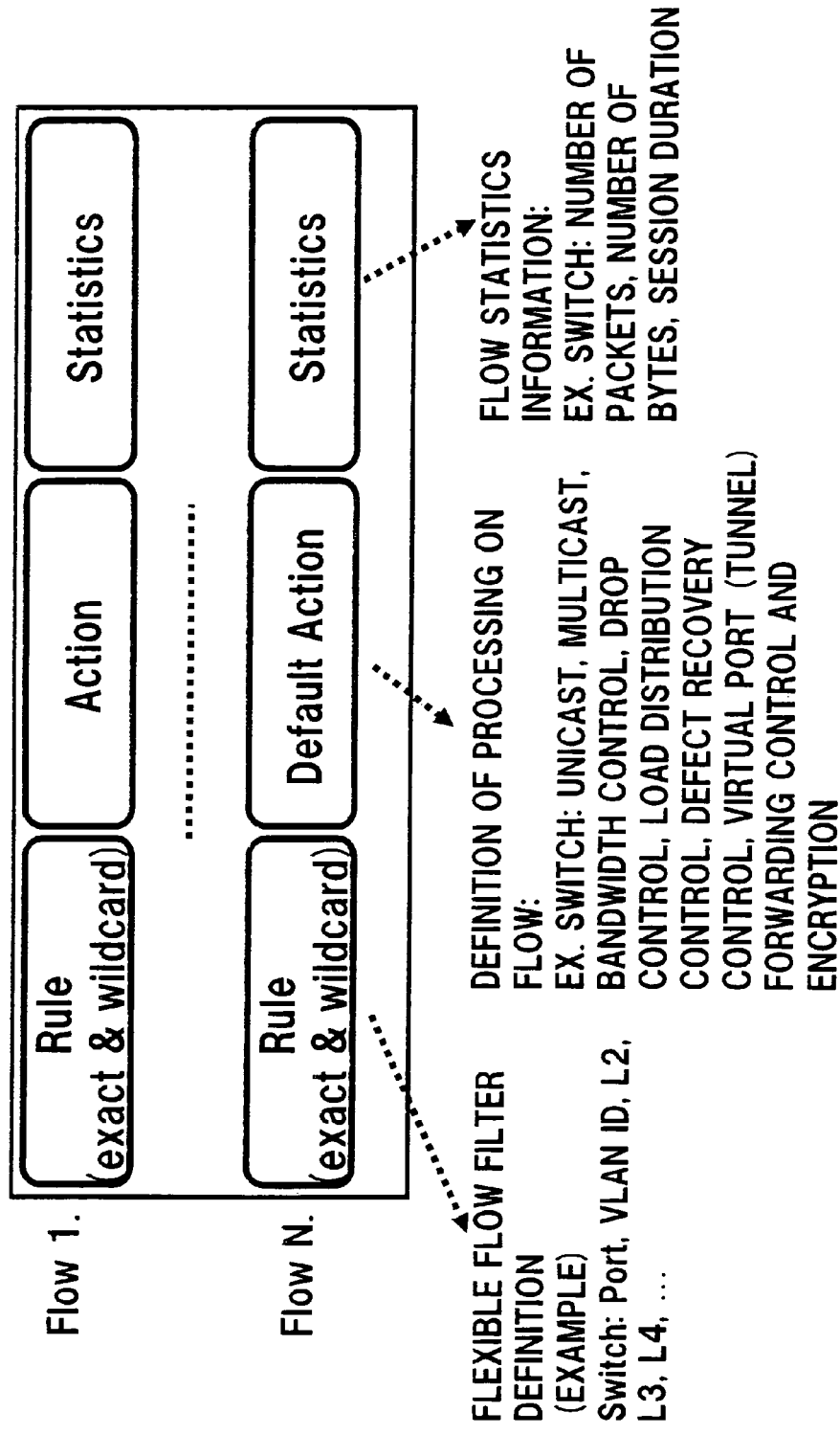
FIG. 24 is a diagram for explaining a flow entity of OFS.

A flow entity of the flow entity table 102 includes a plurality of rules and a plurality of actions, as shown in FIG. 24. Rules include:
  input interface (port);
  MAC source address;
  MAC destination address;
  VLAN (Virtual Local Area Network) ID;
  TYPE;
  IP source address;
  IP destination address; and
  Protocols (UDP (User Datagram Protocol)/TCP (Transmission Control Protocol)/ICPM (Internet Control Message Protocol); including, for ICMP, an ICMP type, an ICMP code and, for TCP/UDP, a source port and a destination port.

The action may include
  Action Type;
  Output; and
  Modification of a field of a packet header (Field Modify). In FIG. 27, there are shown examples of the modification of a field of a packet header.

Specified values may be set respectively to whole fields in the rule. A wild card may be specified in any one of the fields in the rule. The value of the field specified by the wildcard may be set so as to be masked in matching to the flow entry. That is, the field specified by the wildcard always match. As for the IP source address and the IP destination address, a prefix length, that is, the length of a network address part of an IP address may be specified in case the wildcard is used.

If the action is OUTPUT, an output interface (port) is included (see FIG. 26).

If the action is to change the header field, the field changed and the value changed are included.

If the action is to change a VLAN tag (an identifier tag inserted in an Ethernet (registered trademark) frame), there are not only change but also addition and deletion (see SET_VLAN_VID, SET_VLAN_VID_PCP and STRIP_VLAN in FIG. 26).

In case of addition, the value of VLAN tag added is specified.

In case of change, the value of VLAN tag changed is specified. Each flow entity includes one or more actions. If no action is specified in the flow entity, the packet that matches to such flow entry, that is, the flow entity in which no action is specified, may be dropped (discarded).

<Valid Path Memory>

Figure 3:
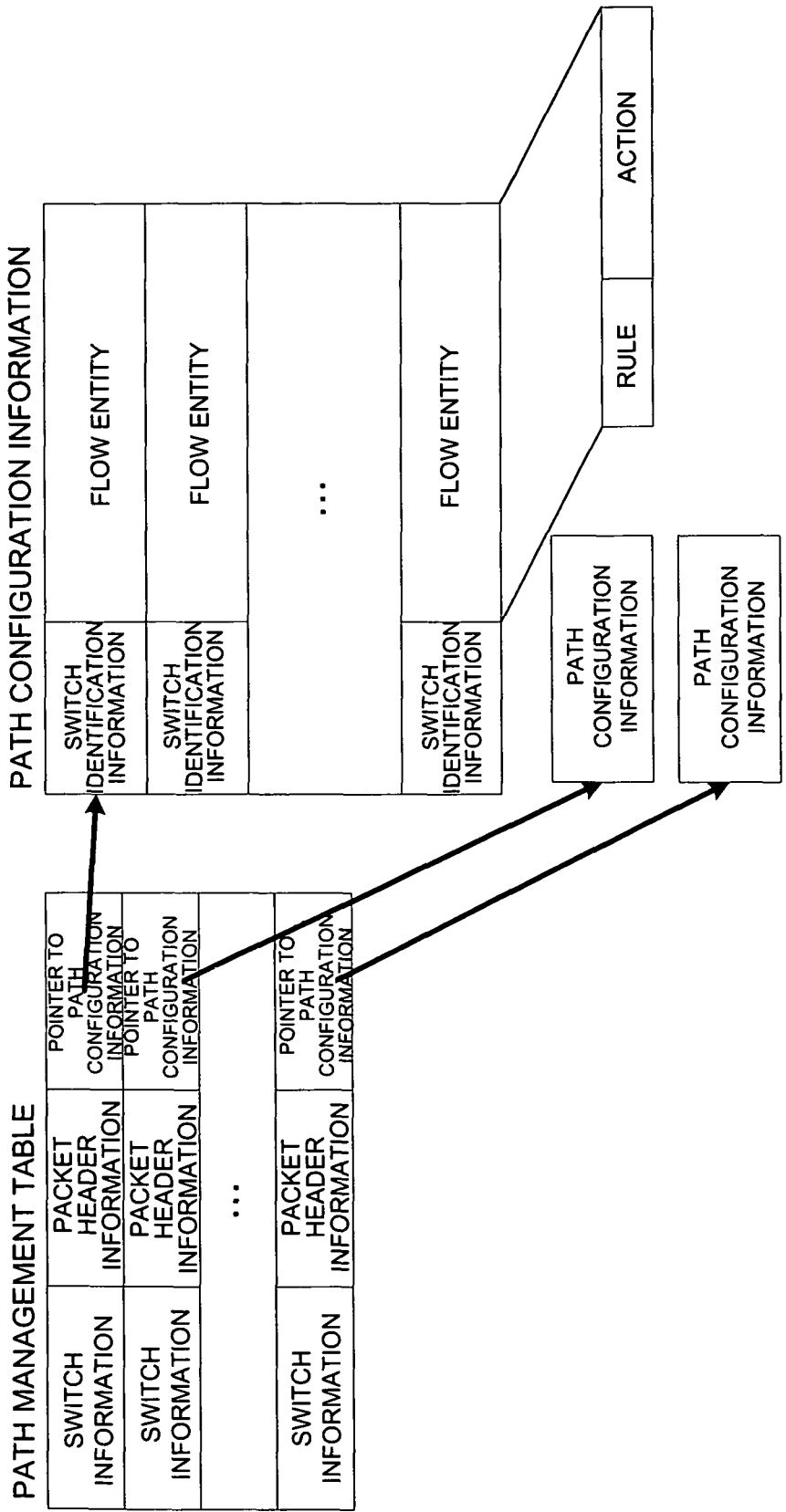
FIG. 3 is a diagram showing an example configuration of a path management table of the valid path memory in the controller of an exemplary embodiment of the present invention and the path configuration information.

The following describes information stored in the valid path memory 203. FIG. 3 shows an example structure of data stored in the valid path memory 203.

<Path Management Table>

A path management table manages the path configuration information for each path. In the path management table, one path and hence the path configuration information for one path correspond to each entry. In each entry of the path management table, there is provided information (for example, switch ID or interface) of a switch that forms a path and that receives a packet (first packet) which is a trigger for causing the controller 20 to newly create the path, header information of the packet, and a pointer that points to the path configuration information for the said path. Regarding the packet header information, only the IP address of the source and that of the destination may be recorded.

<Path Configuration Information>

The path configuration information includes, for each path, a set of identification information and a flow entity of each one of switches composing each path (switches at a start, mid and end points of the path). In case a path is composed of n-number of switches, there are n-number of sets of the switch identification information and flow entities set in the switches. One of the n sets is pointed to by the pointer of a relevant entry of the path management table. By referencing the path configuration information, it may be seen which switches a currently valid path is composed of. Each flow entity includes a rule and a action. The flow entity may also include the flow statistic information. The path configuration information may be configured in a table format. Or, it may also be in the form of a linear list (linked list) in which a set of the switch information and the flow entity includes a pointer that points to another set of the switch information and the flow entity for the next following switch on the path. In case a new path is calculated by the path calculation unit 205, the path configuration information is registered in the path management table of the valid path memory 203 by the switch state changing unit 206. The path which is invalidated due to path deletion, for example, is deleted from the valid path memory 203 by the switch state changing unit 206.

<Flow Entity Table>

Figure 4:
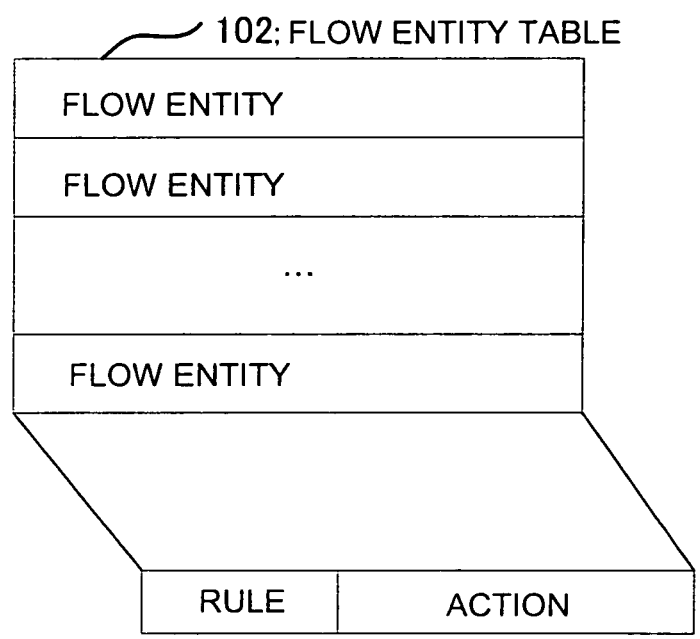
FIG. 4 is a diagram showing an example flow entity table of a switch according to an exemplary embodiment of the present invention.

FIG. 4 shows an example configuration of the flow entity table 102 stored in the switch 10. The flow entity table is a table for the switch 10 to store and hold the flow entity specified by the controller 20. In case n-number of different flows pass the switches 10, n flow entities corresponding to the flows, are held by the switches 10.

FIG. 4 shows a flow entity made up of a rule and an action (flow entity=|rule|action|), thus indicating that each flow entity includes a single action. It is however of course possible, in the present exemplary embodiment, that a single flow entity includes a plurality of actions, that is, flow entry=|ruled action 1||action 2|... |action m|), where m is a preset integer not less than 2.

<Path Cache>

Figure 5:
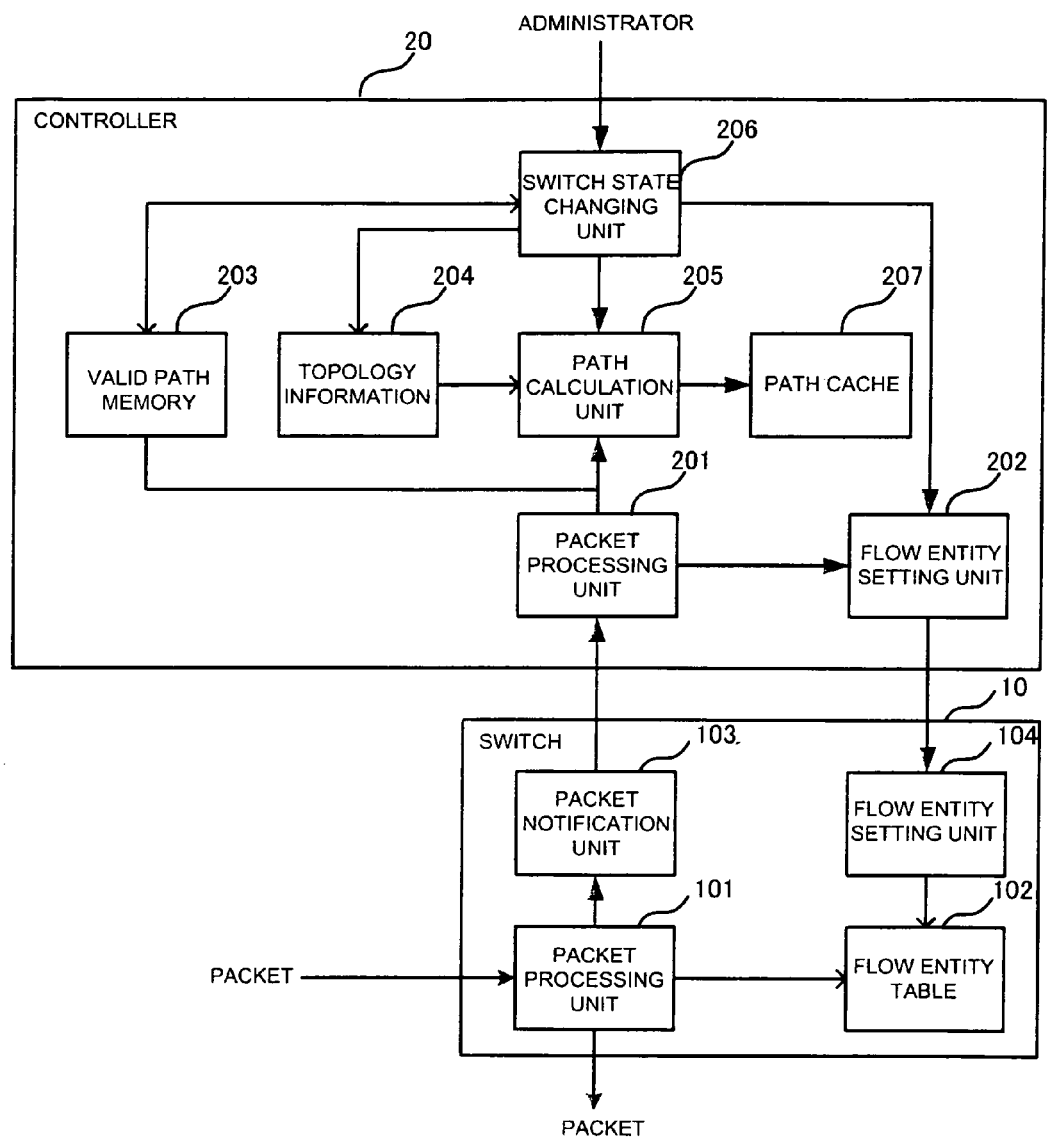
FIG. 5 is a diagram showing an example configuration of a controller and a switch according to another exemplary embodiment of the present invention.

FIG. 5 shows a configuration of another exemplary embodiment of the present invention. Referring to FIG. 5, the controller 20 includes a path cache 207 in addition to the configuration of FIG. 2. Except for the path cache 207, the controller 20 has the same configuration at that of FIG. 2, while the switch 10 has the same configuration as that of FIG. 2. The path information is cached in the path cache 207. In the path cache 207, a switch or a node as a start point;
a switch or a node as an end point; and
identifiers of switches on the path are stored as one cache entry.

The present exemplary embodiment may be so configured that a path passing a bypass switch is deleted from the entry of the path cache at a time point of instruction for bypassing.

The following describes an exemplary embodiment of the present invention using a concrete network topology as an example.

<Example of Network Topology>

Figure 6:
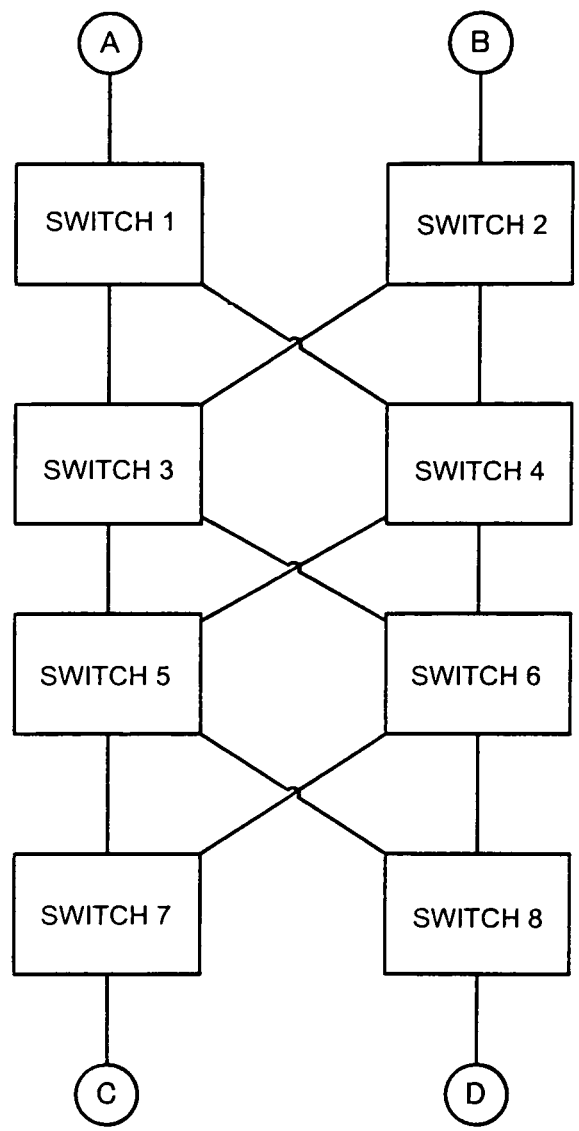
FIG. 6 is a diagram showing an example network configuration.

FIG. 6 shows an example of the network topology. In FIG. 6, the switches 1 to 8 are under centralized control by a controller (not shown). A to D indicate nodes not controlled for packet forwarding from the controller, such as switches, servers, storage devices, load balancers, firewalls or routers. An example of the topological information of the network configuration of FIG. 6 is shown in the following Table 1. Although not limited thereto, in the example of Table 1, the termination points (switches) and the destinations of the termination points are stored in tabulated form as the data structure of the topological information:

TABLE 1

| Information of termination points | Information of destinations | | | |
| --- | --- | --- | --- | --- |
| | Interface 1 | Interface 2 | Interface 3 | Interface 4 |
| switch 1 | A | switch 3 | switch 4 | |
| switch 2 | B | switch 3 | switch 4 | |
| switch 3 | switch 1 | switch 2 | switch 5 | switch 6 |
| switch 4 | switch 1 | switch 2 | switch 5 | switch 6 |
| switch 5 | switch 3 | switch 4 | switch 7 | switch 8 |
| switch 6 | switch 3 | switch 4 | switch 7 | switch 8 |
| switch 7 | switch 5 | switch 6 | C | |
| switch 8 | switch 5 | switch 6 | D | |

It is assumed that there are four interfaces (ports) in each switch and that relevant devices are connected to the respective interfaces. As switch identification information, a numerical value that stands for a switch and an identifier uniquely allocated to the switch are used.

From Table 1, the switch 1 is connected via interfaces 1, 2 and 3 to the node A and to the switches 3 and 4, respectively. The switch 2 is connected via interfaces 1, 2 and 3 to the node B and to switches 3 and 4, respectively. The switches 3 and 4 are each connected via interfaces 1, 2, 3 and 4 to the switches 3, 4, 7 and 8. The switches 5 and 6 are each connected via interfaces 1, 2, 3 and 4 to the switches 3, 4, 7 and 8. The switch 7 is connected via interfaces 1, 2 and 3 to the switches 5 and 6 and to the node C, respectively. The switch 8 is connected via interfaces 1, 2 and 3 to the switches 5 and 6 and to the node D, respectively. As the node identification information, one or both of the MAC address and the IP address may be used. There may be a plurality of MAC addresses and a plurality of IP addresses for each node.

<Operation on Packet Arrival>

As a premise for switch bypassing in the exemplary embodiment, the operation when a packet arrives at a switch will now be described.

It is assumed that a packet from a node A, addressed to a node D, arrives at a switch 1. As regards the packet header information, MAC address of the node A is set as MAC source address;
MAC address of the node D is set as MAC destination address;
IP source address of the node A is set as IP source address; and
IP address of the node D is set as IP destination address.

In this packet header, there are cases where a VLAN tag is used and where it is not used. Here, the explanation is dispensed with. An arbitrary value is set to the port number. Here, the explanation is again dispensed with.

Initially, the operation when a first packet arrives at the interface 1 of the switch 1 from the node A, in FIG. 6, will be described with reference to a flowchart of FIG. 7.

1. The packet arrives at the interface 1 of the switch 1 from the node A (step S1).

2. The packet processing unit 101 of the switch 1 retrieves (step S2), within the flow entity table 102, whether or not there is a flow entity having a rule which coincides with the packet that has arrived at S1. The flow entity table 102 is configured for example as a CAM (Contents Addressable Memory).

3. If, as a result of retrieval, there is a coincident flow entity (Yes branch at step S3), processing transfers to step S4. If there is no coincident flow entity (No branch at step S3), processing transfers to step S6.

4. The packet processing unit 101 of the switch 1 performs the action specified by the coincident flow entity (step S4).

5. After performing the action, the processing comes to an end (step S5).

6. The packet processing unit 101 of the switch 1 specifies, for the packet notification unit 103, the packet that has arrived, and the interface at which the packet arrived (interface 1). The packet processing unit 101 instructs the packet notification unit 103 to make a corresponding notification to the controller 20 (step S6).

7. The packet notification unit 103 of the switch 1 notifies the controller 20 of the interface information specified in the step S6 and the packet. The following processing from the following step 8 to 16 is the processing to be performed by the controller 20.

8. The packet processing unit 201 of the controller 20 receives a packet from the switch 1 (step S8).

9. The packet processing unit 201 of the controller 20 specifies the switch that has received the packet and the packet header to instruct the path calculation unit 205 to calculate the path (step S9).

10. The path calculation unit 205 of the controller 20 identifies a switch having a destination of connection in the topology information 204 which is coincident with the MAC destination address or the IP destination address of the packet header (step S10).

11. Using the topology information 204, the path calculation unit 205 of the controller 20 calculates a path having, as a termination point, the switch identified in step S9 (the switch that received the packet) and a switch identified in step S10. That is, the path calculation unit calculates a path (or, derives which switches the path is to pass) (step S11).

12. Based upon the path, calculated in step S11, the path calculation unit 205 of the controller 20 creates flow entities to be set in respective switches on the path (step S12).

13. The path calculation unit 205 of the controller 20 notifies the packet processing unit 201 of the controller 20 of the switches created in step S12 and flow entities to be set in the switches on the path (step S13).

14. The packet processing unit 201 of the controller 20 creates an entry of the path management table from the pointer of the path configuration information and the information received in step S9, where the path configuration information is composed of the switches and the flow entities to be set therein, as notified in S13, and stores the created entry the valid path memory 203 of the controller 20 (step S14).

15. The packet processing unit 201 of the controller 20 specifies the switches and the flow entities, to be set therein, as notified in step S13, and instructs the flow entity setting unit 202 of the controller 20 to set the flow entities (step S15).

16. The flow entity setting unit 202 of the controller 20 instructs the respective switches 10 specified in step S15 to set flow entities therein (step S16). The next following processing operations 17 and 18 are executed by the switch 10.

17. When instructed by the controller 20 to set the flow entity, the flow entity setting unit 104 of the switch 10 records the specified flow entity in the flow entity tables 102 of the switch 10 (step S17).

18. The flow entity setting unit 104 of the switch 10 notifies the controller 20 of the completion of the setting of the flow entity (step S18). The following 19 and 20 are the processing carried out by the controller 20.

19. The flow entity setting unit 202 of the controller 20 waits until it receives the notification of the completion of the setting of the entirety of the flow entities instructed in step S16. On receipt of the notification on the completion of the setting of the entirety of the flow entities, the flow entity setting unit 202 of the controller 20 notifies the packet processing unit 201 of the completion of the setting of the flow entities (step S19).

20. On receipt of the notification of the completion from the flow entity setting unit 202, the packet processing unit 201 of the controller 20 returns (step S20) the interface and the received packet to the switch that has received the packet in step S8. The following processing is the processing carried out by the switch 10.

21. On receipt of the packet which is sent back from the controller 20, the switch 10 regards the packet as received from the interface specified and performs re-processing of the packet in the packet processing unit 101 (step S21).

In calculating the path in step S11, a Dijkstra's algorithm (shortest path finding algorithm), for example, is used.

In case of matching to a plurality of flow entities in step S4, the entirety of the actions of the plurality of flow entities are performed.

Figure 7:
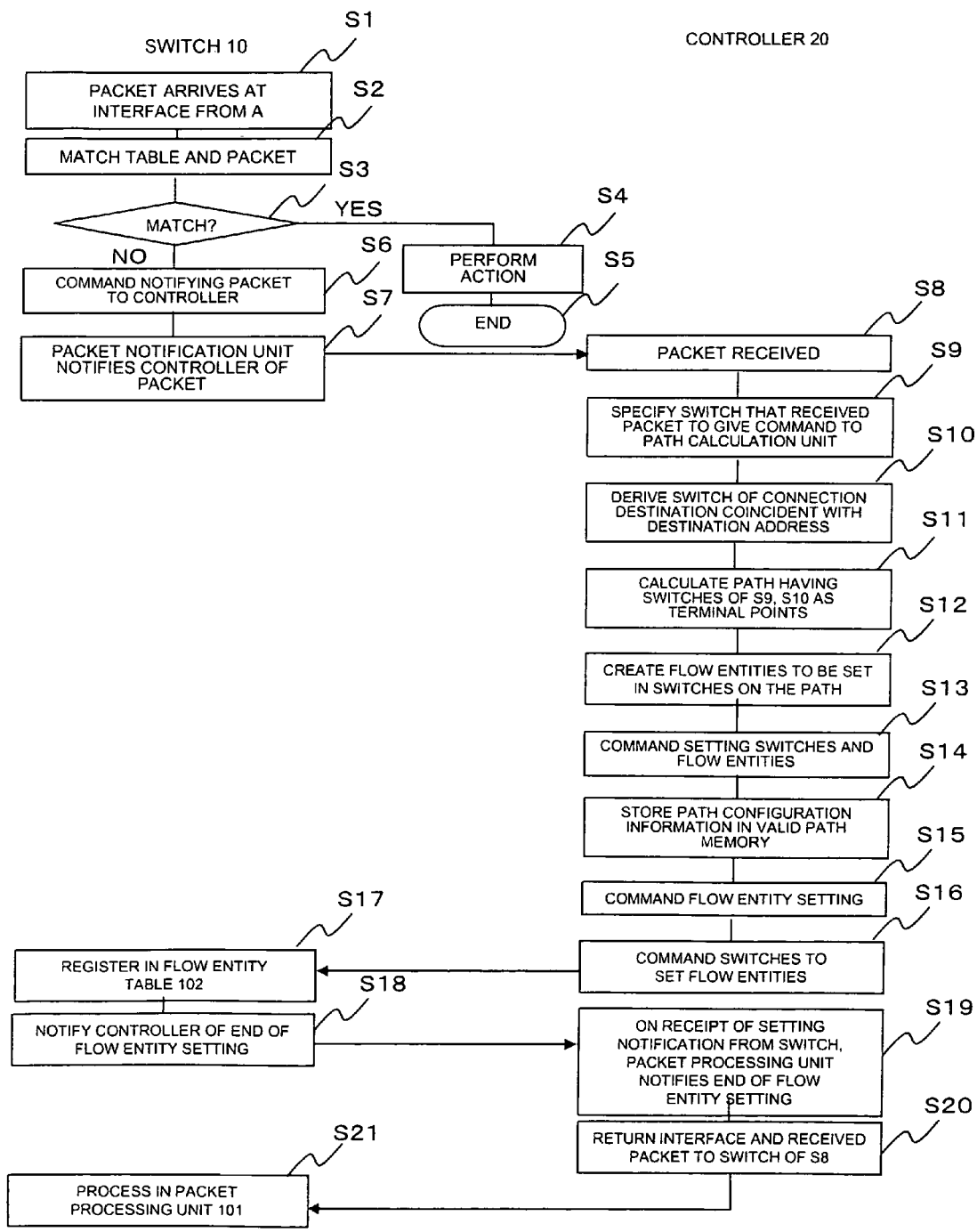
FIG. 7 is a flowchart for explaining the operation on receipt of a first packet (First Packet) in an exemplary embodiment of the present invention.

In the procedure of FIG. 7, the first packet is sent to the switch in step S20. The packet is forwarded in accordance with a path created (see (A) of FIG. 8).

Figure 8:
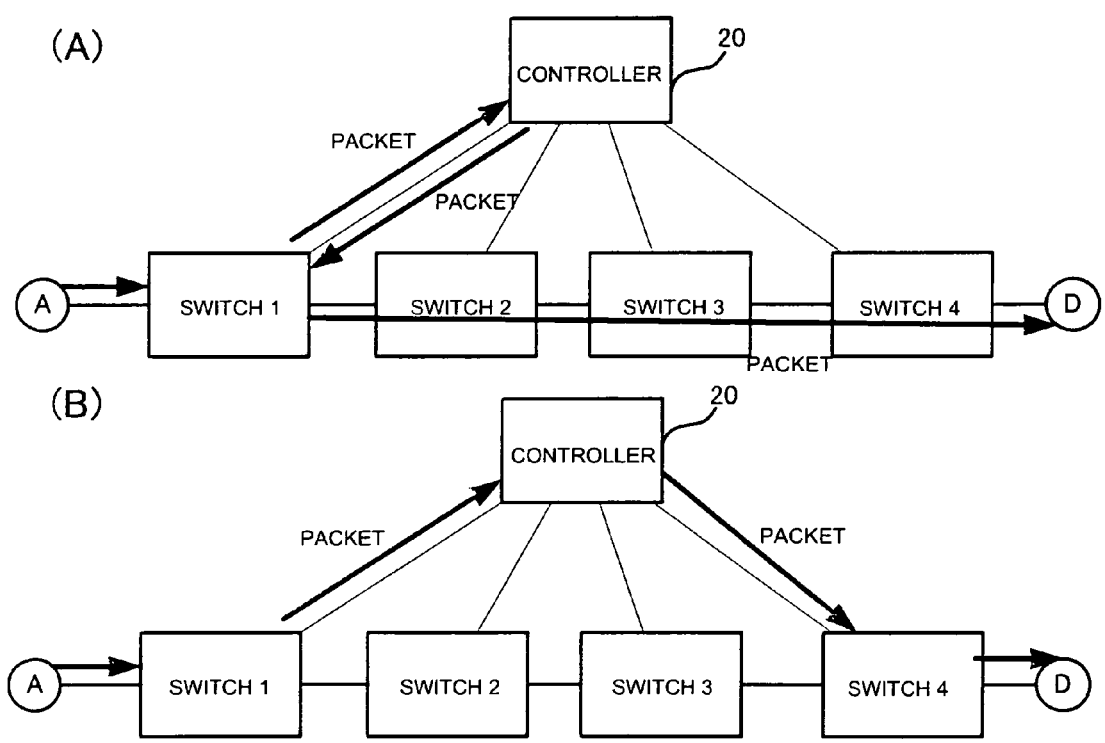
FIG. 8 is a diagram for explaining the operation on receipt of a first packet (First Packet) in an exemplary embodiment of the present invention.

It is however also possible for the controller 20 to send the first packet to the switch 4 located at the termination point, specifying to the switch 4, an interface via which the packet is sent, thus the switch 4 being caused to forward the packet to the node D, as shown in (B) of FIG. 8.

An example path to be calculated by the path calculation unit 205 in FIG. 6 is shown as follows:
  node A→switch 1 switch 4→switch 6→switch 8→node D
<Example of Flow Entity>
An example flow entity as set for the path of FIG. 6 is given below. In the present example, the fields other than the specified fields of the rule are wildcarded. However, the fields in their entirety may explicitly be specified. The flow entities are recorded corresponding to the path configuration information of the valid path memory 203 (see FIG. 3). For each of the switches that make up a path, a set of the switch identification information and a flow entity including a rule and an action make up one entry of the path configuration information. The set made up of the switch identification information and the flow entity of the switch is stored in a table structure or in a list structure in the valid path memory 203, as set out above. In the following, a flow entity is represented by a list structure, only for convenience.

(flow entity m switch n rule (x) action (y))
indicates an entry of an m'th flow entity where the switch identification information indicates a switch n, the rule is x and an action is y.

A linked list structure ((flow entity 1), (flow entity 2), ..., (flow entity n)) corresponds to the path configuration information for one path. The switch n corresponds to the switch identification information of FIG. 3. The rule (x) and the action (y) correspond to the flow entity made up of the rule and the action of FIG. 3. The flow entity m indicates that it is the m'th flow entity in the path configuration information of FIG. 3. In the following notation, a single flow entity is shown as including a single action (y) and such flow entities where the rule is common and the actions are different are shown in juxtaposition for a single switch. However, this notation is for ease of understanding. Accordingly, it is also possible that a single flow entity is made up of a single rule (x) and a plurality of actions y1, y2, . . . .

((flow entity 1
    switch 1
    rule (destination IP address=IP address of node D)
    action (OUTPUT: interface 3))
(flow entity 2
    switch 4
    rule (destination IP address D=IP address of node D)
    action (OUTPUT: interface 4))
(flow entity 3
    switch 6
    rule (destination IP address=IP address of node D)
    action (OUTPUT: interface 4))
(flow entity 4
    switch 8
    rule (destination IP address=IP address of node D)
    action (OUTPUT: interface 3)))

The above example is setting for one way. However, setting may also be made for to and fro. The following is an example for to and fro. In this case, the following flow entities are recorded as the path configuration information of the valid path memory 203.

((flow entity 1
    switch 1
    rule (destination IP address=IP address of node D)
    action (OUTPUT: interface 3))
(flow entity 2
    switch 4
    rule (destination IP address D=IP address of node D)
    action (OUTPUT: interface 4))
(flow entity 3
    switch 6
    rule (destination IP address=IP address of node D)
    action (OUTPUT: interface 4))
(flow entity 4
    switch 8
    rule (destination IP address=IP address of node D)
    action (OUTPUT: interface 3))

(flow entity 5
  switch 8
  rule (destination IP address=IP address of node A)
  action (OUTPUT: interface 2))
(flow entity 6
  switch 6
  rule (destination IP address=IP address of node A)
  action (OUTPUT: interface 2))
(flow entity 7
  switch 4
  rule (destination IP address=IP address of node A)
  action (OUTPUT: interface 1))
(flow entity 8
  switch 1
  rule (destination IP address=IP address of node A)
  action (OUTPUT: interface 1)))

<Path Caching>

Figure 9:
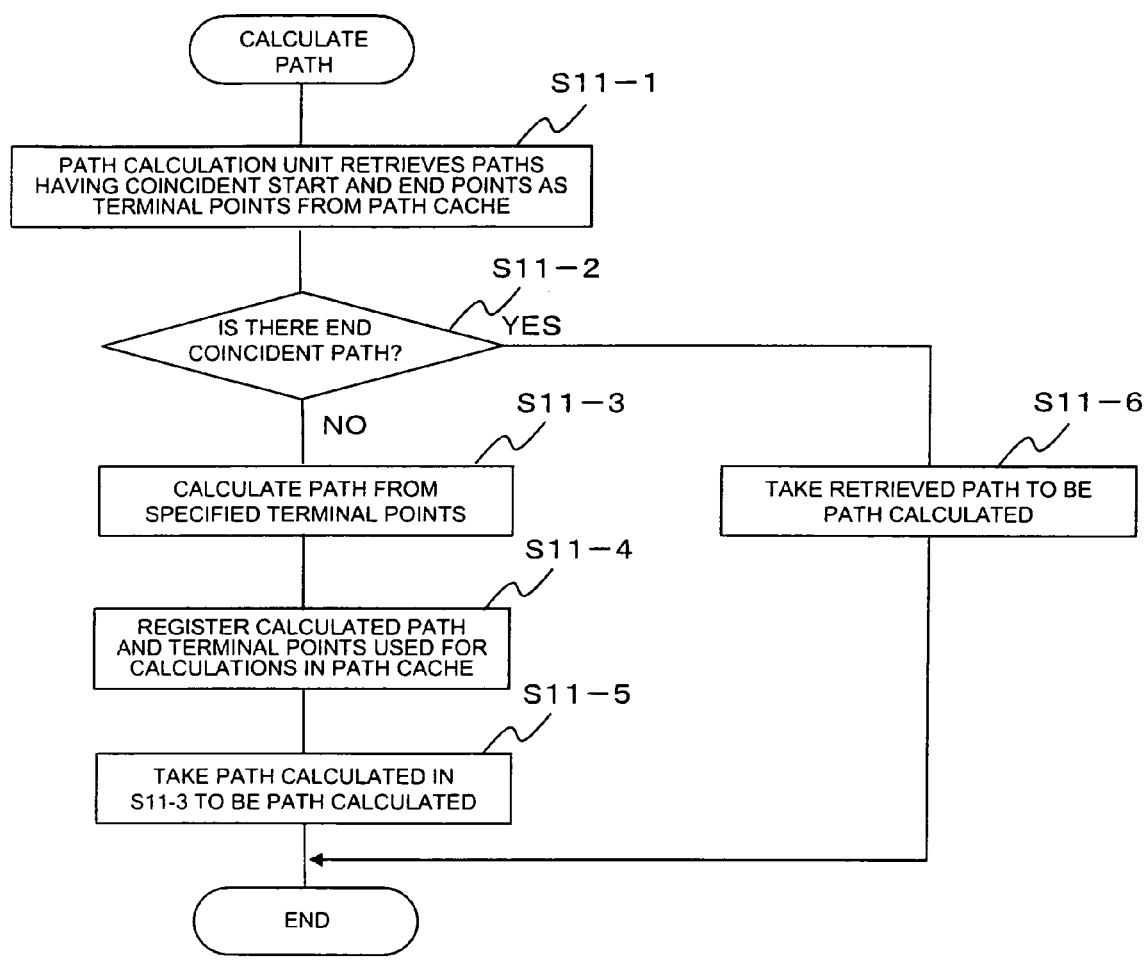
FIG. 9 is a flowchart for explaining the procedure of path calculation of FIG. 7.

The following describes an example of using the path cache 207, shown in FIG. 4, in which the path calculation unit 205 of FIG. 5 caches the path. The step S11 of FIG. 7 is as shown in FIG. 9.

1. The path calculation unit 205 retrieves, from the path cache 207, such a path where the start point coincides with the end point (step S11-1).
2. If, as a result of the retrieval, there is no path matched to such condition (No branch at S11-2), the path calculation unit 205 calculates a path from the termination points specified (step S11-3).
3. The path calculation unit 205 registers the path calculated and termination points used for the calculation, as a set, in the path cache 207 (step S11-4).
4. The path calculation unit 205 takes the path calculated in step S11-3 to be a calculated path (step S11-5).
5. The processing ends.
6. If, as a result of the retrieval in step S11-1, there is such a path that matches the condition (Yes branch at S11-2), the path calculation unit 205 takes the path retrieved to be a calculated path (step S11-6).

<Bypass Procedure 1>

Figure 10:
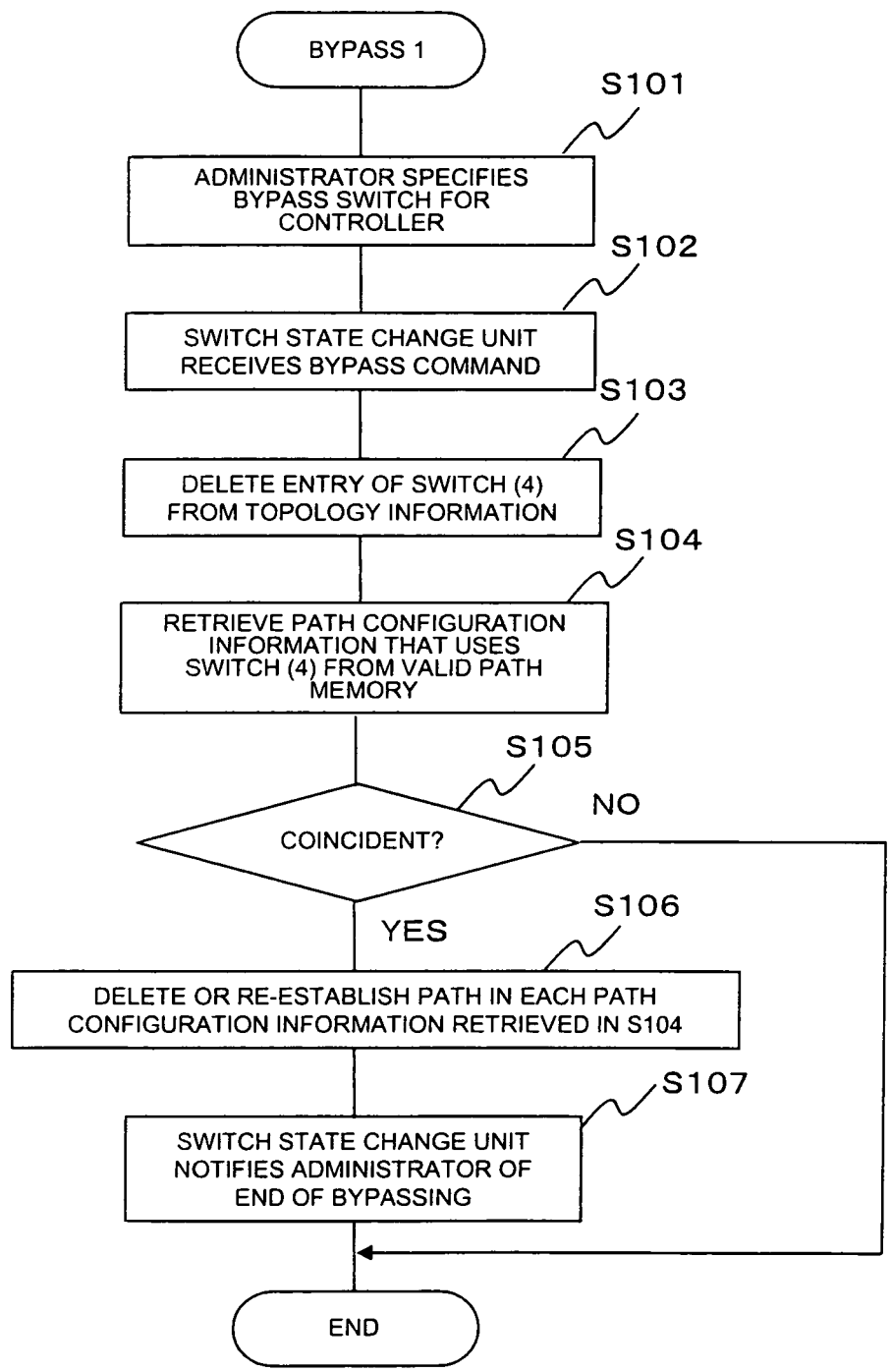
FIG. 10 is a flowchart for explaining the procedure of first bypassing according to an exemplary embodiment of the present invention.

The following describes by-passing in the present exemplary embodiment. An administrator (system administrator) specifies a switch to give instructions to the controller 20. In the present exemplary embodiment, a case of bypassing the switch 4 of FIG. 6 is taken for explanation. FIG. 10 is a flowchart showing the bypass procedure of the present exemplary embodiment. The bypass procedure will now be described with reference to FIGS. 2, 6 and 10.

1. The administrator specifies the switch (switch 4) to give a bypassing command to the controller 20 (S101).
2. The switch state changing unit 206 of the controller 20 receives the bypassing command to bypass the switch specified by the administrator (step S102).
3. The switch specified in step S101 is deleted from the topology information (step S103).
4. The switch state changing unit 206 of the controller 20 retrieves, from the valid path memory 203, path configuration information where the specified switch (switch 4) is used (step S104). The switch state changing unit 206 retrieves the path management table of the valid path memory 203 (see FIG. 3) to check to see whether or not there exists path configuration information that uses the switch 4. If there exist a plurality of items of path configuration information that use the switch 4, the switch state changing unit 206 extracts the path configuration information which falls under the condition.
5. If, as a result of search in step S104, the information that matches the condition exists, processing transfers to a step S106.
6. If, as a result of search in step S104, no information that matches the condition exists, the processing ends.
7. In each path configuration information, retrieved in step S104, path deletion and path re-establishment are carried out (step S106).
8. The switch state changing unit 206 notifies the administrator of the end of bypassing (step S107).

<Path Deletion Procedure>

Figure 11:
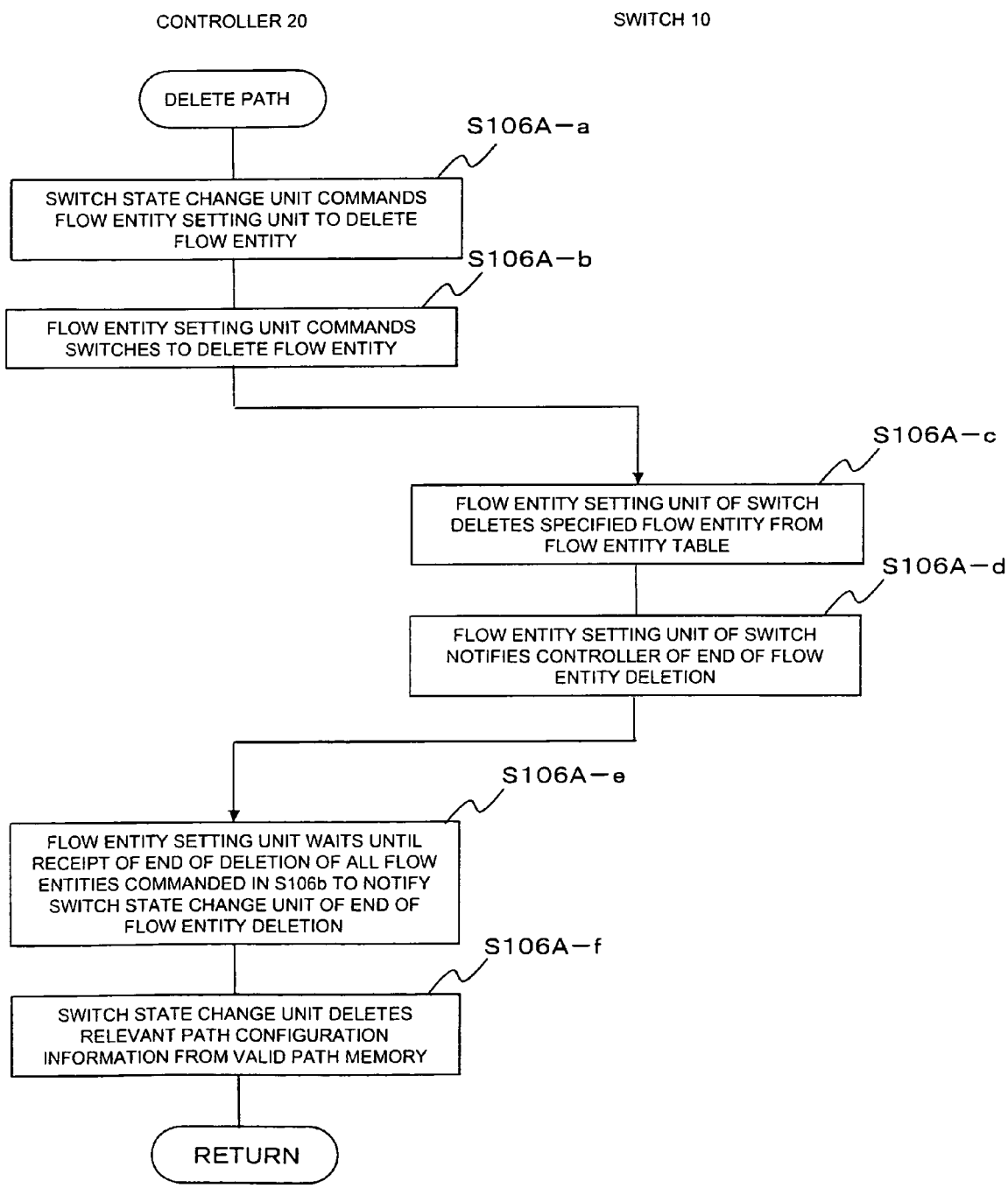
FIG. 11 is a flowchart for explaining the procedure of path deletion of S106 of FIG. 10.

The following describes the procedure of path deletion of step S106 of FIG. 10 with reference to FIG. 11.

a. The switch state changing unit 206 of the controller 20 specifies the switch and the flow entity recorded in the path configuration information retrieved in step S104 of FIG. 10, and instructs the flow entity setting unit 202 of the controller 20 to delete the flow entity (S106A-a).
b. The flow entity setting unit 202 of the controller 20 instructs the switches specified in step S106A-a to delete the flow entity that is to be deleted (S106A-b). The following c and d are performed by the switch 10.
c. Responsive to the instruction by the flow entity setting unit 202 of the controller 20 to delete the flow entity that is to be deleted, the flow entity setting unit 104 of the switch 10 deletes the so specified flow entity from the flow entity table of the switch 10 (S106A-c).
d. The flow entity setting unit 104 of the switch 10 notifies the controller 20 of the completion of deletion of the flow entity (step S106A-d). The following steps e and f are performed by the controller 20.
e. The flow entity setting unit 202 of the controller 20 waits until it receives the notification of the completion of deletion of the entirety of the flow entities instructed at step S106A-b, and notifies the switch state changing unit 206 of the completion of deletion of the flow entities (step S106A-e).
f. The switch state changing unit 206 of the controller 20 deletes the path configuration information (path configuration information retrieved in step S104 of FIG. 10) from the valid path memory 203 (step S106A-f). More specifically, the switch state changing unit 206 deletes, from the path management table of the valid path memory 203 (see FIG. 3), the entries of the path configuration information inclusive of the bypass switch (set of the switch identification information and the flow entities) and an entry of the path management table that points to the said path configuration information.

<Procedure for Path Re-Establishment>

Figure 12:
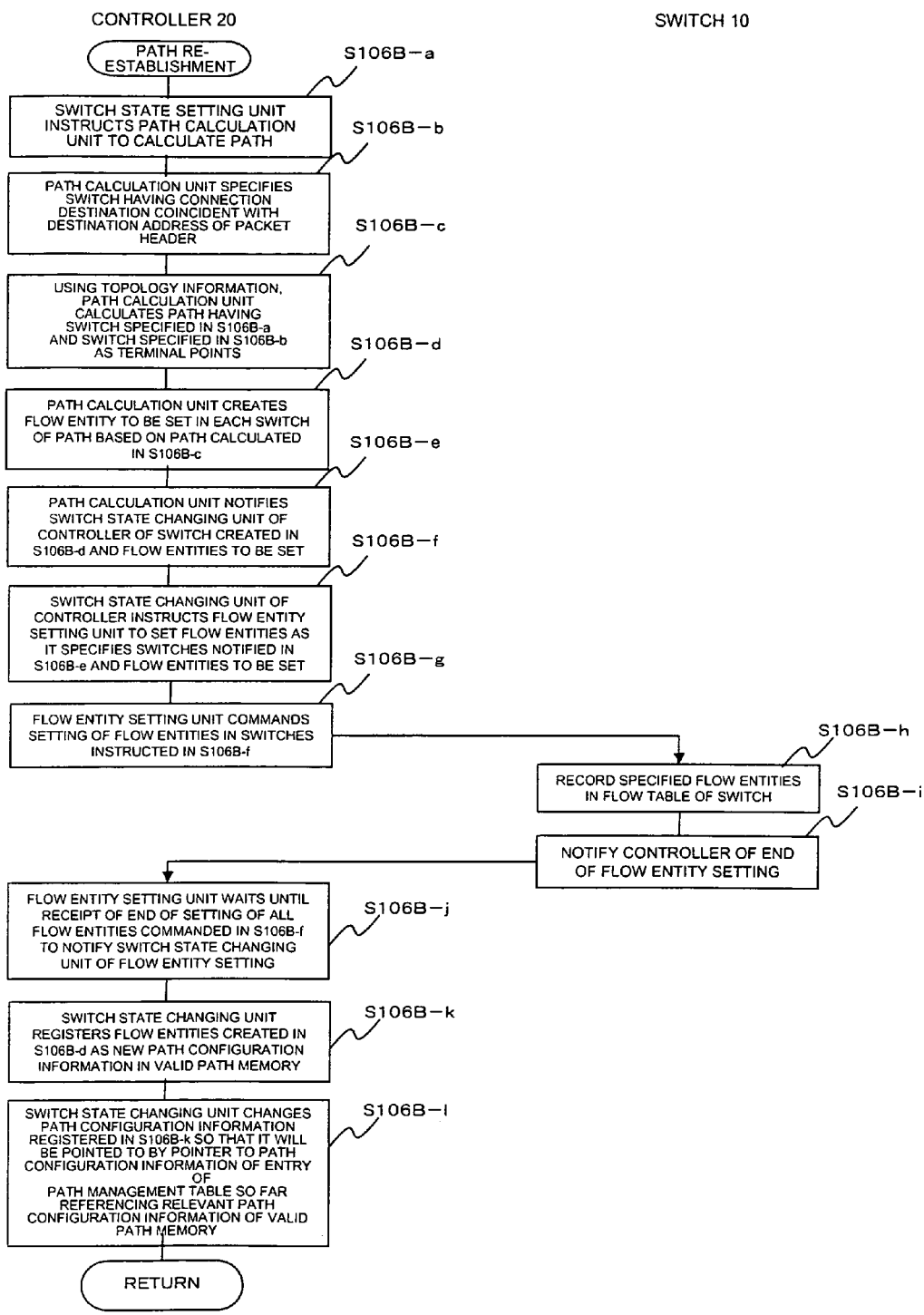
FIG. 12 is a flowchart for explaining the procedure of path re-establishment of S106 of FIG. 10.

The following describes the procedure of path re-establishment of the step S106 of FIG. 10 with reference to FIG. 12.

a. The switch state changing unit 206 of the controller 20 instructs the path calculation unit 205 to calculate the path (S106B-a), specifying a switch included in the switch information (switches constituting the path) of an entry of the path management table pointing to the path configuration information in the valid path memory 203 (see FIG. 3), and a packet header of an entry of the path management table pointing to the said path configuration information.
b. The path calculation unit 205 of the controller 20 identifies, in the topology information 204, a switch that has a destination of connection coincident with the destination address of the specified packet header (MAC destination address or the IP destination address) in step S106B-b.
c. The calculation unit 205 of the controller 20 calculates, using the topology information, a path having, as a termination point, the switch specified in step S106B-a and the switch specified in step S106B-b (switch having a connection destination coincident with the destination address) in step S106B-c.

d. The calculation unit 205 of the controller 20 creates, based on the path as calculated in step S106B-c, a flow entity to be set in each switch on the path (step S106B-d).

e. The calculation unit 205 of the controller 20 notifies the switch state changing unit 206 of the controller 20 of the flow entities to be set switches created in step S106B-d (step S106B-e).

f. The switch state changing unit 206 of the controller 20 specifies flow entities to be set and the switches, notified in step S106B-e, and instructs the flow entity setting unit 202 of the controller 20 to set flow entities (step S106B-f).

g. The flow entity setting unit of the controller 20 instructs the switches, specified in step S106B-f, to set the flow entities (step S106B-g) to be set. The following step h and i are performed by the switch 10.

h. When instructed to set the flow entities from the controller 20, the flow entity setting unit 104 of the switch 10 records the flow entity specified in the flow entity table 102 of the switch (step S106B-h).

i. The flow entity setting unit 104 of the switch 10 notifies the controller 20 of the completion of the flow entity setting (step S106B-i). The following step is performed by the controller 20.

j. The flow entity setting unit 202 of the controller 20 waits until it receives the notification of the completion of setting of the entirety of the flow entities instructed in step S106B-f, and notifies the switch state changing unit 206 of the completion of the setting of the flow entities (step S106B-j).

k. The switch state changing unit 206 registers the flow entities, created in step S106B-d, in the valid path memory 203 as new path configuration information (S106B-k).

l. The switch state changing unit 206 changes the path configuration information, registered in step S106B-k, so that the path configuration information is pointed to by a pointer to the path configuration information of the entry of the path management table (see FIG. 3), which so far has been pointing to the relevant path configuration information in the valid path memory 203 (step S106B-l).

Table 2 shows the topology information following the bypass setting by the above procedure.

TABLE 2

| Terminal point information | Connection destination information | | | |
|---|---|---|---|---|
| | Interface 1 | Interface 2 | Interface 3 | Interface 4 |
| switch 1 | A | switch 3 | | |
| switch 2 | B | switch 3 | | |
| switch 3 | switch 1 | switch 2 | switch 5 | switch 6 |
| switch 5 | switch 3 | | switch 7 | switch 8 |
| switch 6 | switch 3 | | switch 7 | switch 8 |
| switch 7 | switch 5 | switch 6 | C | |
| switch 8 | switch 5 | switch 6 | D | |

It is seen from Table 2 that the entry of the switch 4 of Table 1 has been deleted. The switch 1 is connected via interfaces 1 and 2 to the node A and to the switch 3, respectively. The switch 2 is connected via interfaces 1 and 2 to the node B and to the switch 3, respectively. The switch 2 is connected via interfaces 1, 2, 3 and 4 to the switches 1, 2, 5 and 6, respectively. The switches 5 and 6 are each connected via interfaces 1, 3 and 4 to the switches 3, 7 and 8, respectively. The switch 7 is connected via interfaces 1, 2 and 3 to the switches 5, 6 and to the node C, respectively. The switch 8 is connected via interfaces 1, 2 and 3 to the switches 5, 6 and to the node D, respectively.

In FIG. 6, for a path which passes the switch 4 (switch to be bypassed):

node A→4 switch 1→switch 4→switch 6→switch 8→node D, the following path:

node A→switch 1→switch 3→switch 6→switch 8→node D is set as a bypass path.

In case the path is cached in the path cache 207 (see FIG. 5), the write-back processing of S103 of FIG. 10 is carried out.

The switch state changing unit 206 instructs the path calculation unit 205 to invalidate the path cache, specifying a switch.

The path calculation unit 205 retrieves the path cache 207 to invalidate such an entry where the specified switch is on the path.

Figure 13:
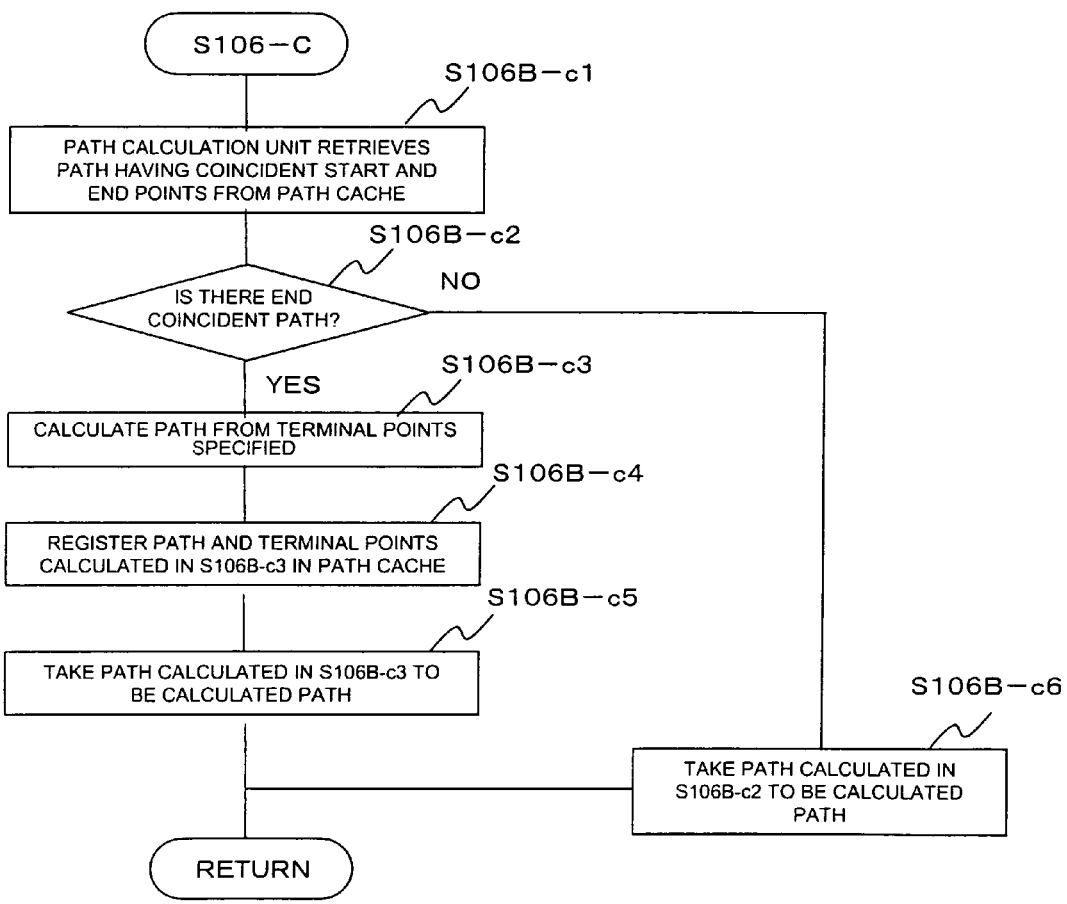
FIG. 13 is a flowchart for explaining a modification of S106B-c of FIG. 12.

The processing of S106B-c of FIG. 12 is changed as shown in FIG. 13.

<Path Calculation Using Path Cache>

From the path cache 207, the path calculation unit 205 searches for a path where the start point and the end point coincide with each other (step S106B-c1).

If, as a result of search, there is a path that matches the above condition (Yes branch at step S106B-c2), processing transfers to step S106B-c3 and, if otherwise, processing transfers to step S106B-c6.

A path is calculated from specified termination points (step S106B-c3).

The path calculated in step S106B-c3 and the termination points used for the calculation as a set are registered in the path cache 207 (step S106B-c4). The path calculated in step S106B-c3 is taken to be the path calculated and then the processing ends.

The path retrieved in step S106B-c2 is taken to be the path calculated (step S106B-c6) and the processing ends.

<Bypassing Procedure 2>

Figure 14:
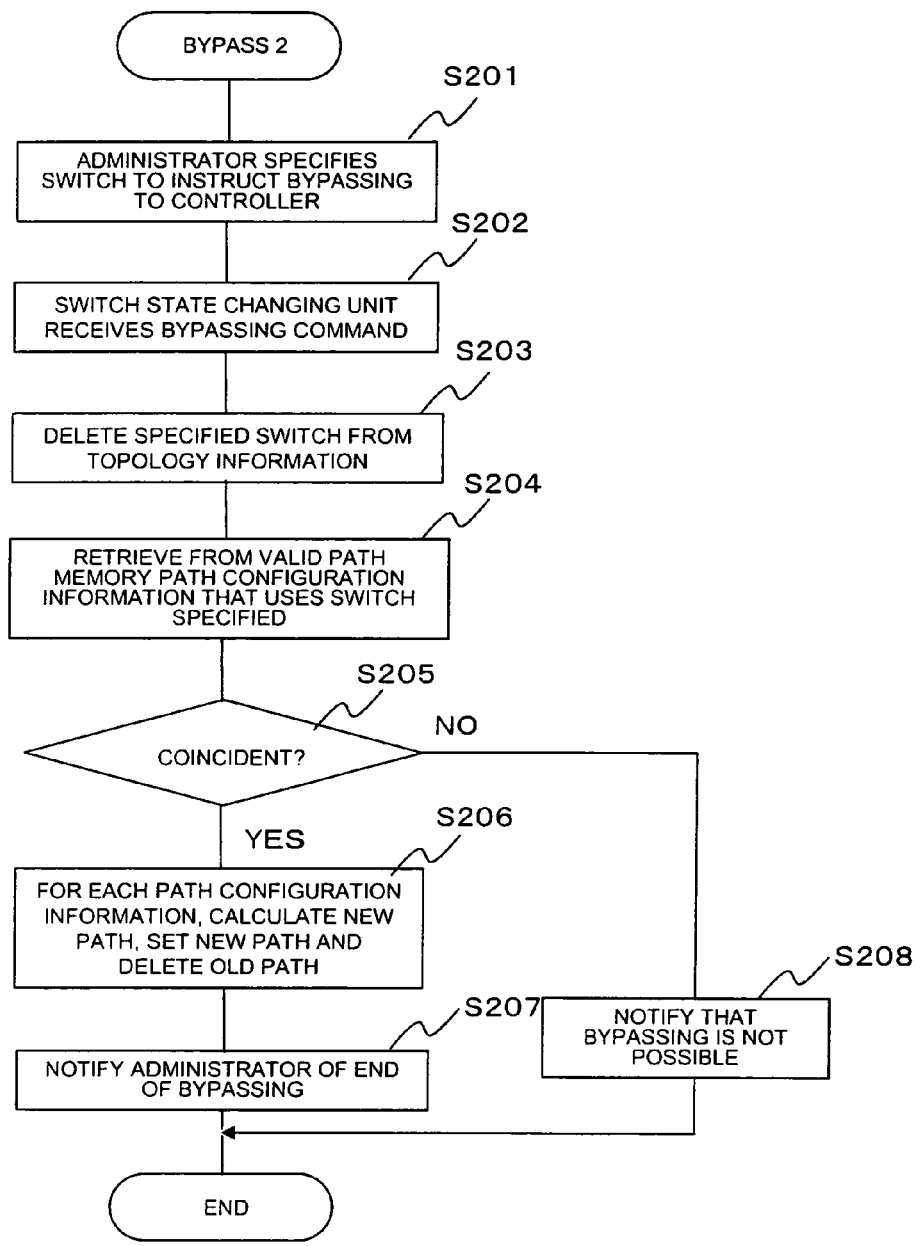
FIG. 14 is a flowchart for explaining the procedure of second bypassing according to an exemplary embodiment of the present invention.

The following describes another exemplary embodiment of the present invention. In the present exemplary embodiment, bi-casting is used for the bypass switch. If, after creating the new path, the old path is to be deleted, a plurality of OUTPUT actions are specified to replicate the packet and send the so replicated packets (bi-casting or multi-casting). FIG. 14 is a flowchart for explaining the bypassing procedure of the present exemplary embodiment.

1. An administrator specifies a switch (switch 4) and instructs the controller to bypass the switch (switch 4) (step S201).

2. The switch state changing unit 206 of the controller 20 receives a bypass command with the switch specified by the administrator (step S202).

3. The switch state changing unit 206 of the controller 20 deletes, from the topology information 204, the entry of the switch specified in step S201 (step S203).

4. The switch state changing unit 206 of the controller 20 searches the valid path memory 203 for a path configuration information that uses the switch specified (S204).

5. If, as a result of the retrieval, there is no path configuration information that matches the condition (No branch at step S205), the switch state changing unit 206 of the controller 20 terminates the processing. If there is a path configuration information that matches the condition (Yes branch at step S205), the switch state changing unit branches to step S206.

6. For each path configuration information, retrieved in step S204, the following A to C are performed (step S206).

A. calculation of a new path;
B. setting of the new path; and
C. deletion of the old path.

7. The switch state changing unit 206 of the controller 20 notifies the administrator of the completion of the bypassing (step S207).

<Procedure of New Path Calculation>

Figure 15:
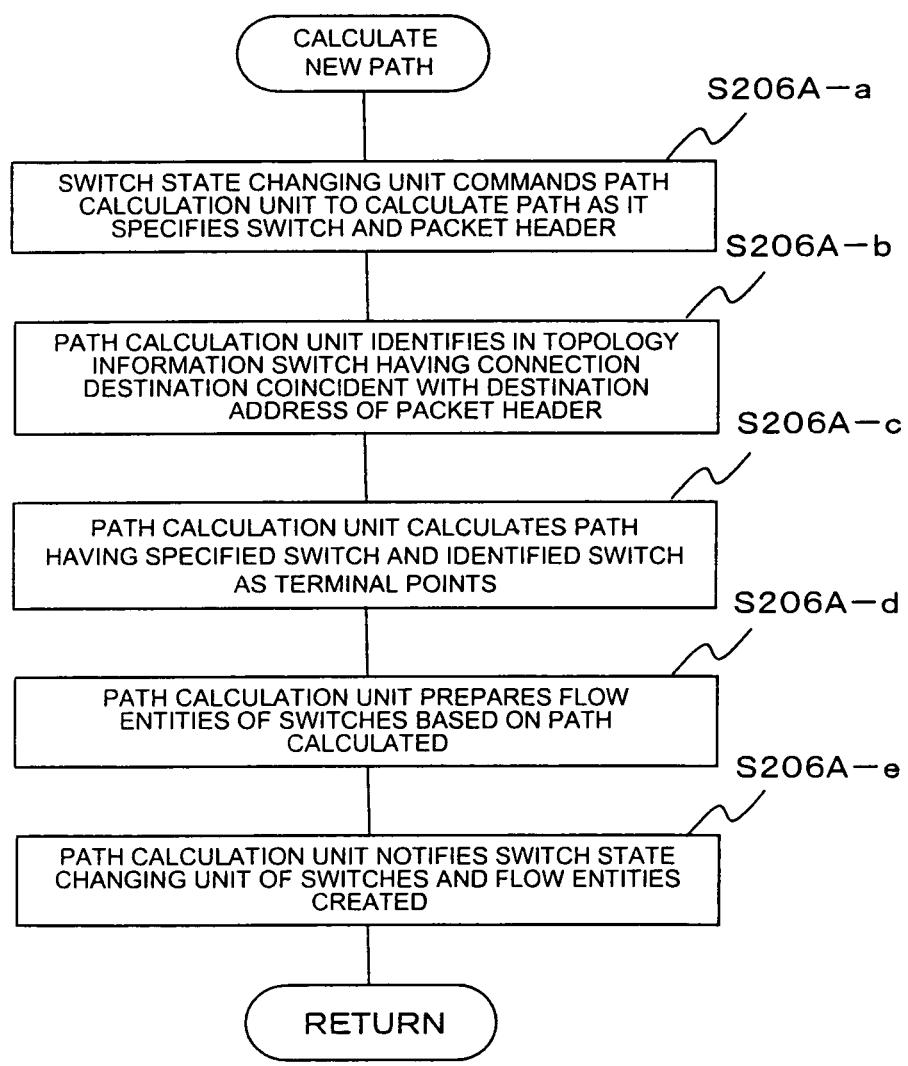
FIG. 15 is a flowchart for explaining the procedure of calculations of a new path of S206 of FIG. 14.

The following describes the processing A in step S206 of FIG. 14 (calculation of a new path) with reference to FIG. 15.

a. The switch state changing unit 206 of the controller 20 specifies a switch contained in the switch information of an entry of the path management table (FIG. 3) pointing to the path configuration information, and a packet header of an entry of the path management table pointing to the path configuration information and instructs the path calculation unit 205 to calculate the path (S206A-a).

b. The path calculation unit 205 of the controller 20 identifies a switch which, in the topology information 204, has a connection destination coincident with a destination address (MAC destination address or an IP destination address) of the packet header (S206A-b).

c. Using the topology information 204, the path calculation unit 205 of the controller 20 calculates a path having the switch specified in step S206A-a and the switch specified in step S206A-b as termination points (S206A-c).

d. Based on the path calculated in step S206A-c, the path calculation unit 205 of the controller 20 creates the flow entity to be set in each switch of the path (S206A-d).

e. The path calculation unit 205 of the controller 20 notifies the switch state changing unit 206 of the controller 20 of the switches created in step S206A-d and the flow entities to be set (step S206A-e).

<Procedure for Setting a New Path>

Figure 16:
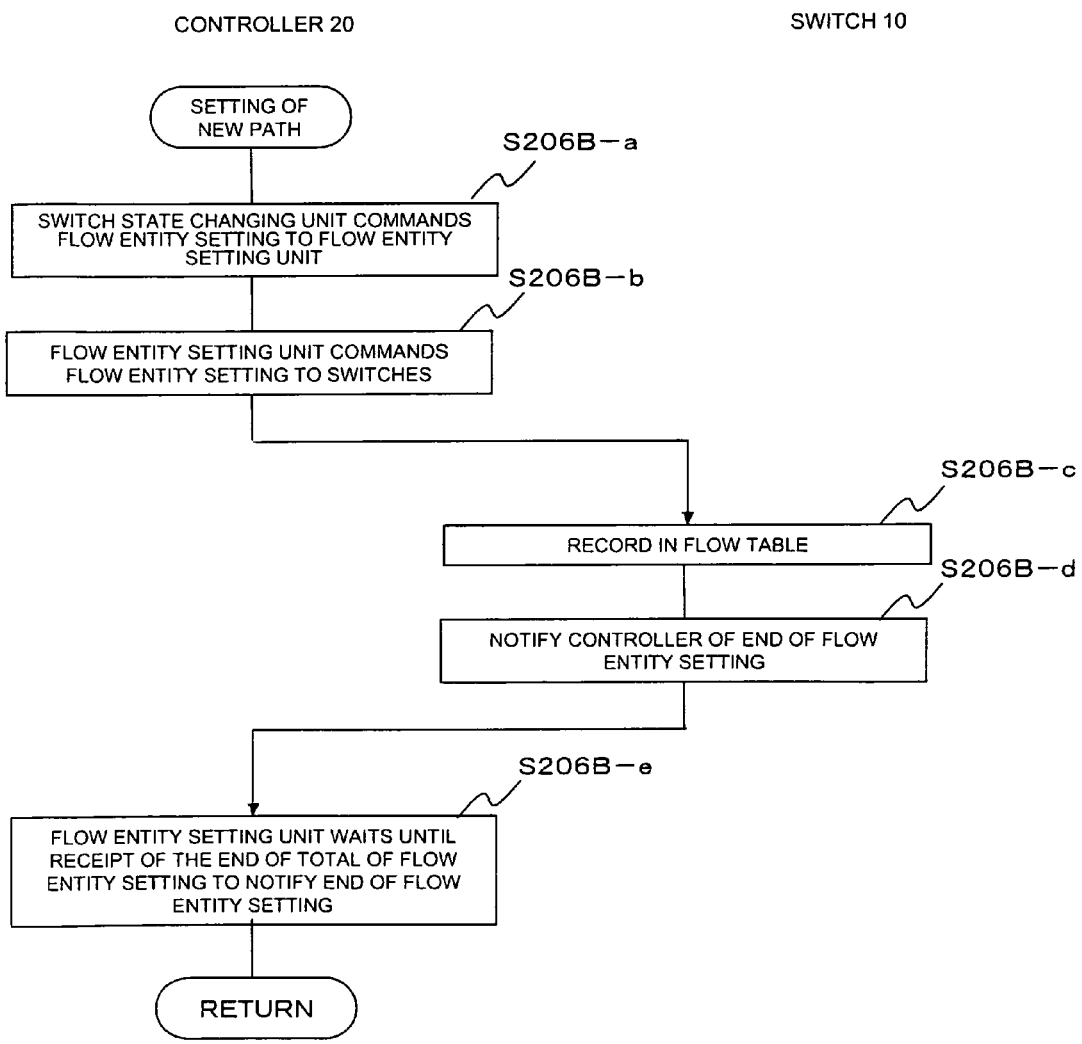
FIG. 16 is a flowchart for explaining the procedure of setting of a new path of S206 of FIG. 14.

The processing B in step S206 of FIG. 14 (setting of a new path) will now be described with reference to FIG. 16.

a. The switch state changing unit 206 of the controller 20 commands the flow entity setting unit 202 of the controller 20 to set flow entities, as the path calculation unit specifies the switches and the flow entities to be set, as notified in step S206A-e (step S206B-a).

b. The flow entity setting unit 202 of the controller 20 instructs the switches, specified in step S206B-a, to set respective flow entities (S206B-b). The following c and d are the processing operations to be performed by the switch 10.

c. When instructed by the controller 20 to set the flow entities, the flow entity setting unit 104 of the switch 10 records the flow entities as specified in the flow entity table 102 of the switch (S206B-c).

d. The flow entity setting unit 104 of the switch 10 notifies the controller 20 of the end of flow entity setting (S206B-d). The following e is the processing to be performed by the controller 20.

e. The flow entity setting unit 202 of the controller 20 waits until it receives the notification of the completion of the setting of the entirety of the flow entities instructed at S206B-a, and notifies the switch state changing unit 206 of the completion of the setting of the flow entities (step S206B-e).

<Procedure of Deleting Old Path>

Figure 17:
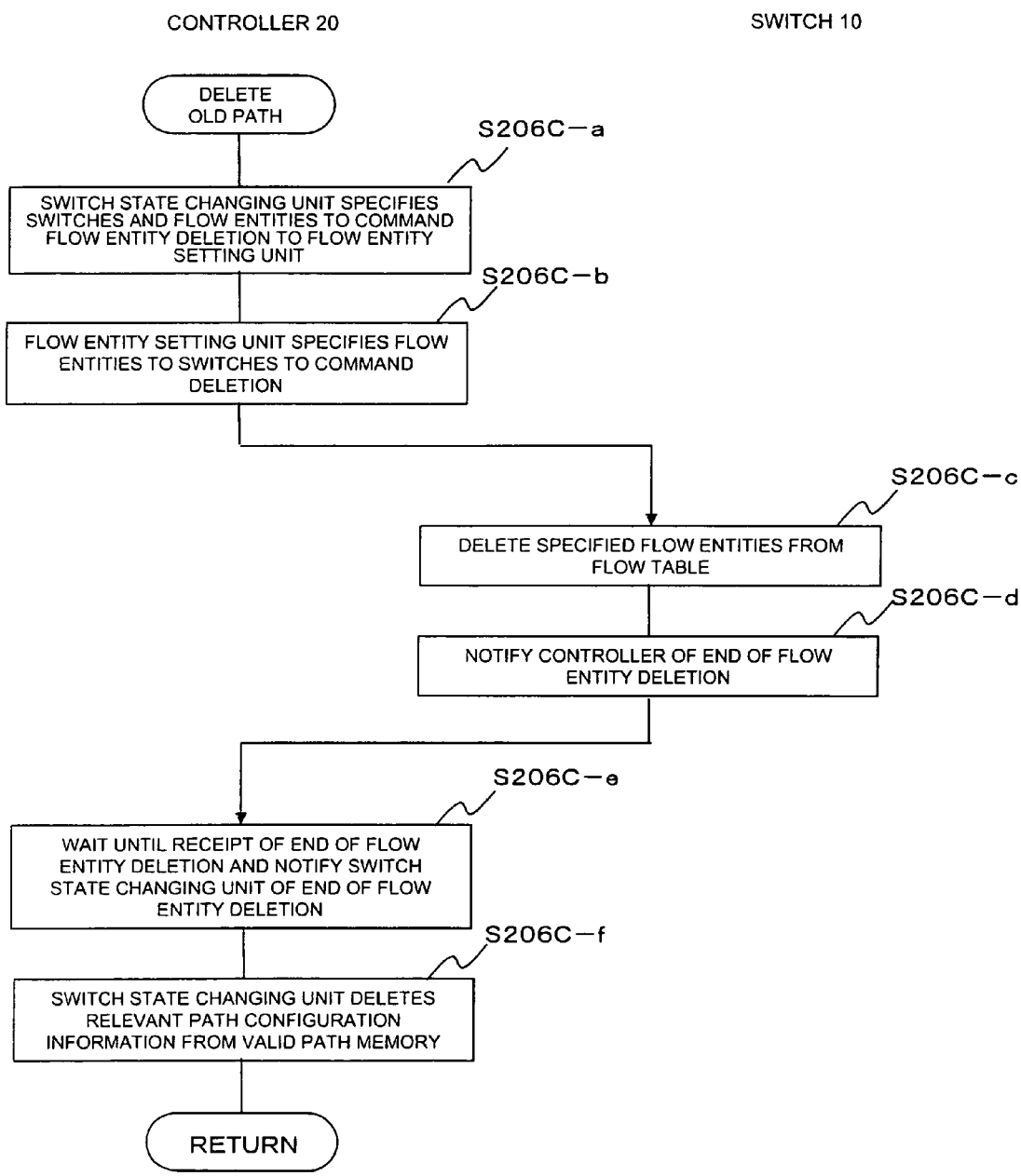
FIG. 17 is a flowchart for explaining the procedure of deletion of an old path of S206 of FIG. 14.

The following describes the processing C of S206 of FIG. 14 (deletion of old path) with reference to FIG. 17.

a. The switch state changing unit 206 of the controller 20 instructs the flow entity setting unit 202 of the controller 20 to delete a flow entity, as the switch state changing unit 26 specifies the switches and the flow entities (see FIG. 3) recorded in the path configuration information as retrieved in step S204 (step S206C-a).

b. The flow entity setting unit 202 of the controller 20 instructs switches, specified in step S206C-a, to specify and delete the flow entities that are to be deleted (S206C-b). The following c and d are carried out by the switch 10.

c. When instructed by the controller 20 to delete the flow entity, the flow entity setting unit 104 of the switch 10 deletes the so specified flow entities from the flow entity table 102 of the switch (step c: S206C-c).

d. The flow entity setting unit 104 of the switch 10 notifies the controller 20 of the completion of deletion of the flow entities (S206C-d). The following steps e and f are performed by the controller 20.

e. The flow entity setting unit 202 of the controller 20 waits until it receives the notification of the completion of deletion of the entirety of the flow entities instructed in step S206C-b, and notifies the switch state changing unit 206 of the completion of deletion of the flow entities (step S206C-e).

f. The switch state changing unit 206 of the controller 20 deletes the relevant path configuration information from the valid path memory 203 (step S206C-f). More specifically, the switch state changing unit 206 deletes, from the path management table (see FIG. 3) in the valid path memory 203, the path configuration information for the path inclusive of the bypass switch (set of the switch identification information and flow entities) and the entry of the path management table pointing to the path configuration information.

<Update of Valid Path Memory>

The following describes the update of the valid path memory 203 in the controller 20.

The switch state changing unit 206 of the controller 20 registers the flow entities, created by the processing A of S206 (calculations of a new path), in the valid path memory 203 as the new path configuration information.

The switch state changing unit 206 changes the path configuration information, registered in the valid path memory 203, so that the information will be pointed to by a pointer to the path configuration information of the entry of the path management table, which has been so far pointing to the relevant path configuration information of the valid path memory 203.

The processing B in step S206 (setting a new path) sets a new path and the processing C of S206 (deleting an old path) deletes the old path. Before the processing C in step S206 (deleting the old path), both the new path and the pre-deletion old path are valid. Hence, multiple OUTPUTs may exist depending on switches, viz., packets may be output (OUTPUT) at multiple interfaces of the switch, such that packets may be sent in duplication to both of the paths.

In the bypassing procedure, as described with reference to FIG. 10 (first bypassing procedure), the old path is deleted first, so that the packet may eventually be lost. With the bypassing procedure, explained with reference to FIG. 14 (second bypassing procedure), it is possible to prevent the packet from being lost.

In the second bypassing procedure, it may be contemplated that the same flow entity is created for the new and old paths, depending on the switches. This may be coped with since a path coincident with the old path is not set in step S206B of FIG. 14, while a path coincident with the new path is not deleted in step S206C of FIG. 14.

A bypassing (tunnel) will now be explained as a separate exemplary embodiment of the present invention. For bypassing, the administrator gives instructions to the controller as the administrator specifies a switch. The following, an example of bypassing the switch 4 of FIG. 5 is shown. Using the MAC destination address, it is controlled whether or not the specification is that of the tunnel specification.

From the MAC and addresses for tunnel passing, address allocation made so that the addresses will be unique for each tunnel applied.

As the MAC addresses for tunnel passing, local addresses are used. If the leading octet 0x02 bits of the MAC address are ON, the addresses are local.

<Tunnel Setting Procedure>

First, the tunnel setting procedure will be described with reference to FIG. 18.

1. The administrator instructs bypassing to the controller (step S301) as the administrator specifies a switch (switch 4).
2. The switch state changing unit 206 of the controller 20 receives a bypassing command as the switch state changing unit has the switch specified from the administrator (step S302).
3. The switch state changing unit 206 of the controller 20 retrieves, from the topology information 204, the switches neighboring to the switch specified in step S301 (step S303).
4. The entry of the switch, specified in step S301, is deleted from the topology information 204 (step S304).
5. The following processing is carried out in step S305 for all of the combinations of the switches selected in step S303:
   A. Calculation of a flow entity for the tunnel; and
   B. Setting of the flow entity for the tunnel.
6. The switch state changing unit 206 of the controller 20 retrieves the path configuration information that uses the switch 4 as specified from the valid path memory 203.
7. If, as a result of retrieval in step S306, there is no match (No branch at S307), the processing ends.
8. The following processing is carried out for each of the path configuration information retrieved in 6 (step S308):
   A. Connection to the tunnel; and
   B. Deletion of the old path at the start point.
9. The switch state changing unit 206 notifies the administrator of the completion of the bypassing (step S309).

<Procedure of Calculations of Flow Entity for Tunnel>

Figure 19:
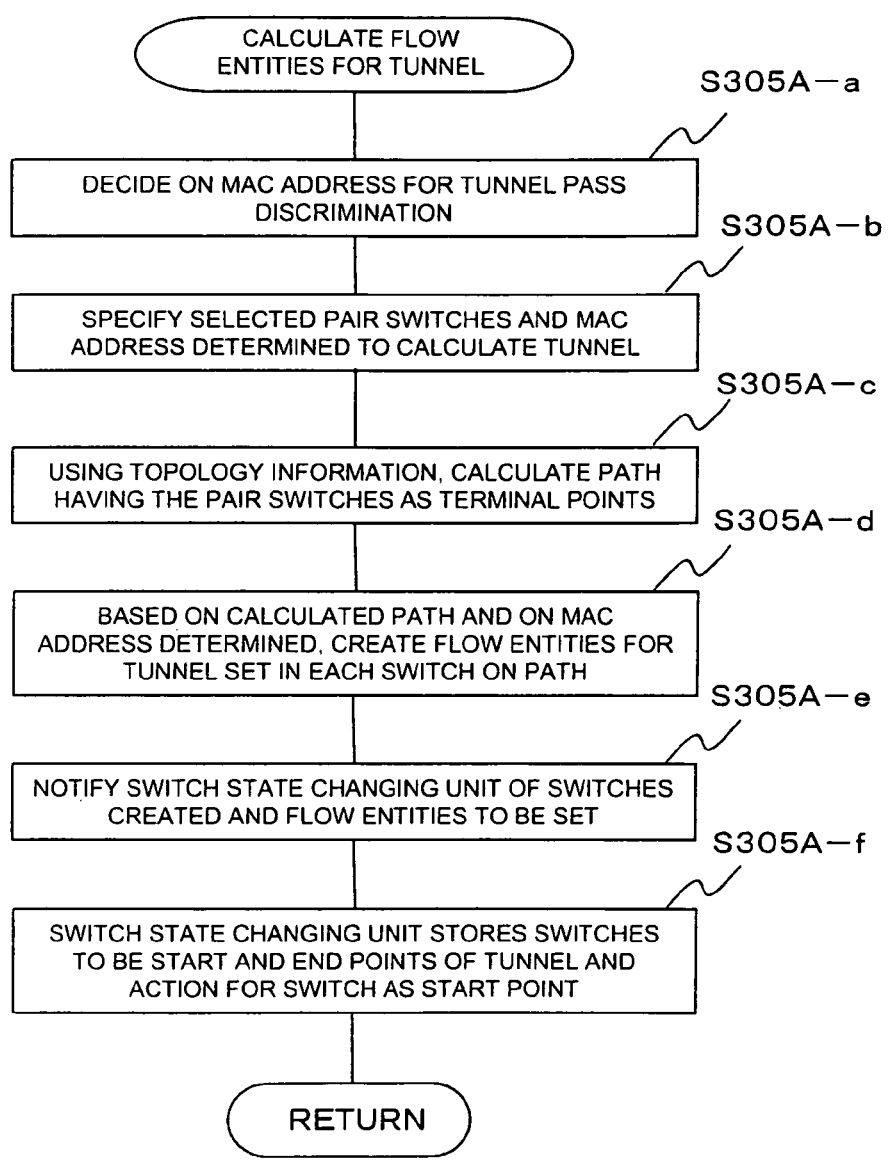
FIG. 19 is a flowchart for explaining the procedure of calculating a flow entity for a tunnel of S305 of FIG. 18.

The following describes the procedure of calculations of flow entities for tunnel in step S305 with reference to FIG. 19.

a. The switch state changing unit 206 of the controller 20 determines a MAC address for discrimination for passing a tunnel in use (step S305A-a).
b. The switch state changing unit 206 of the controller 20 specifies selected pair switches and the MAC address determined in S305A-a to have the path calculation unit 205 of the controller 20 calculate the tunnel (step S305A-b).
c. Using the topology information, the path calculation unit 205 of the controller 20 calculates a path that has target pair switches as termination points (step S305A-c).
d. Based upon the path calculated in S305A-c and the MAC address determined in S305A-a, the path calculation unit 205 of the controller 20 creates the flow entity for tunnel which is to be set in each switch of the tunnel (step S305A-d).
e. The path calculation unit 205 of the controller 20 notifies the switch state changing unit 206 of the controller 20 of the switches created in S305A-d and the flow entities to be set (step S305A-e).
f. The switch state changing unit 206 of the controller 20 saves the switch as the start point and the switch as the end point of the tunnel as well as the action for the switch as the start point (step S305A-f).

<Procedure for Setting Flow Entity for Tunnel>

Figure 20:
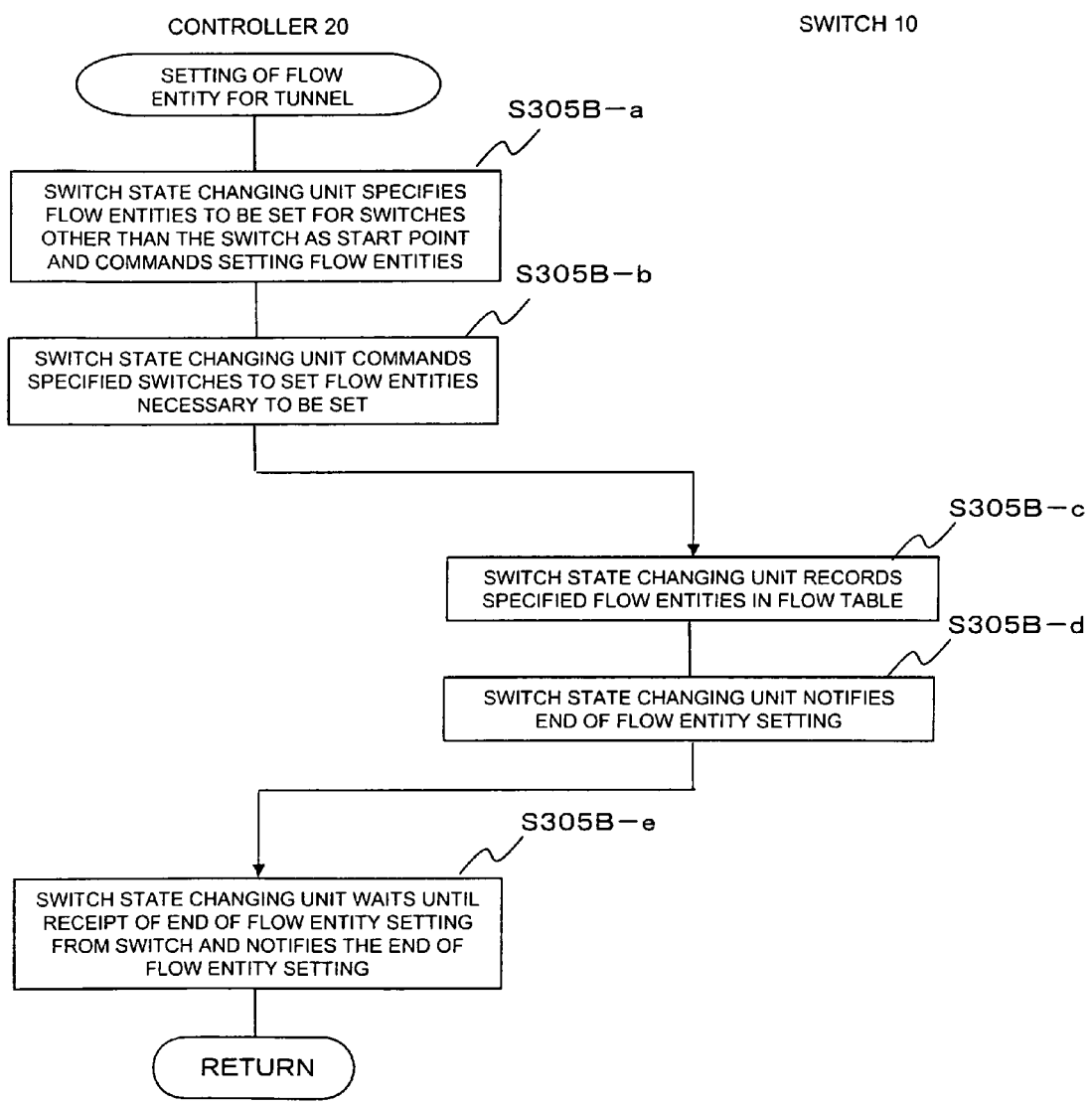
FIG. 20 is a flowchart for explaining the procedure of setting a flow entity for a tunnel of S305 of FIG. 18.

The following describes the procedure for setting a flow entity for a tunnel in S305 with reference to FIG. 20.

a. The switch state changing unit 206 of the controller 20 specifies flow entities to be set for switches notified in S305A-e, except the switch operating as the start point, and instructs the flow entity setting unit 202 of the controller 20 to set the flow entities (step S305B-a).

b. The flow entity setting unit 202 of the controller 20 instructs the switches, specified in S305B-a, to set respective flow entities (step S305B-b). The following step c and d are performed by the switch 10.
c. When the switch 10 is instructed by the controller 20 to set the flow entities, the flow entity setting unit 104 records the flow entities specified in the flow entity table 102 of the switch (step S305B-c).
d. The flow entity setting unit 104 of the switch 10 notifies the controller 20 of the completion of the setting of the flow entities (step S305B-d). The following processing is performed by the controller 20.
e. The flow entity setting unit 202 of the controller 20 waits until it receives the notification of the completion of the setting of the entirety of the flow entities instructed in S305B-a, and notifies the switch state changing unit 206 of the completion of the setting of the flow entities (step S305B-e).

<Procedure for Connection to Tunnel>

Figure 18:
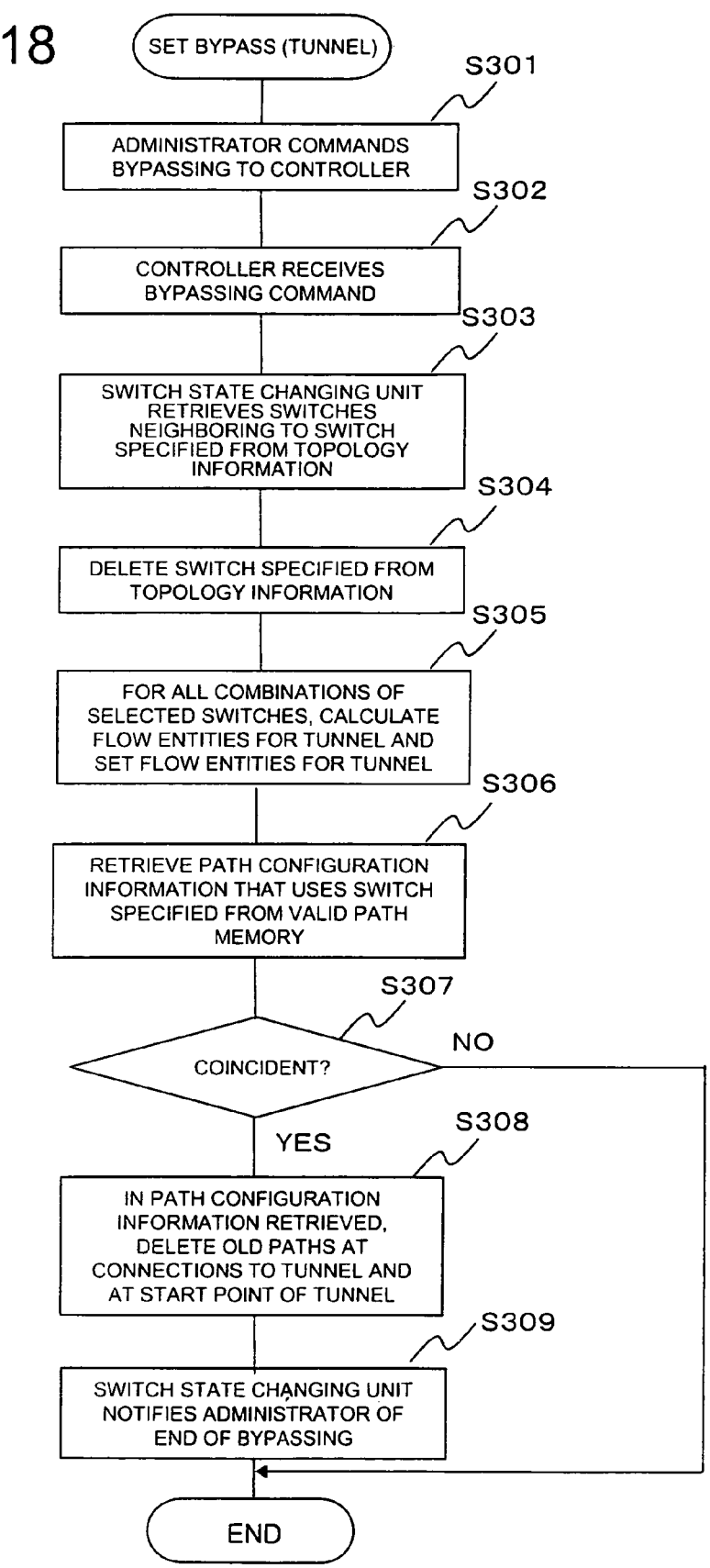
FIG. 18 is a flowchart for explaining the procedure of setting a bypass (tunnel) of an exemplary embodiment of the present invention.
Figure 21:
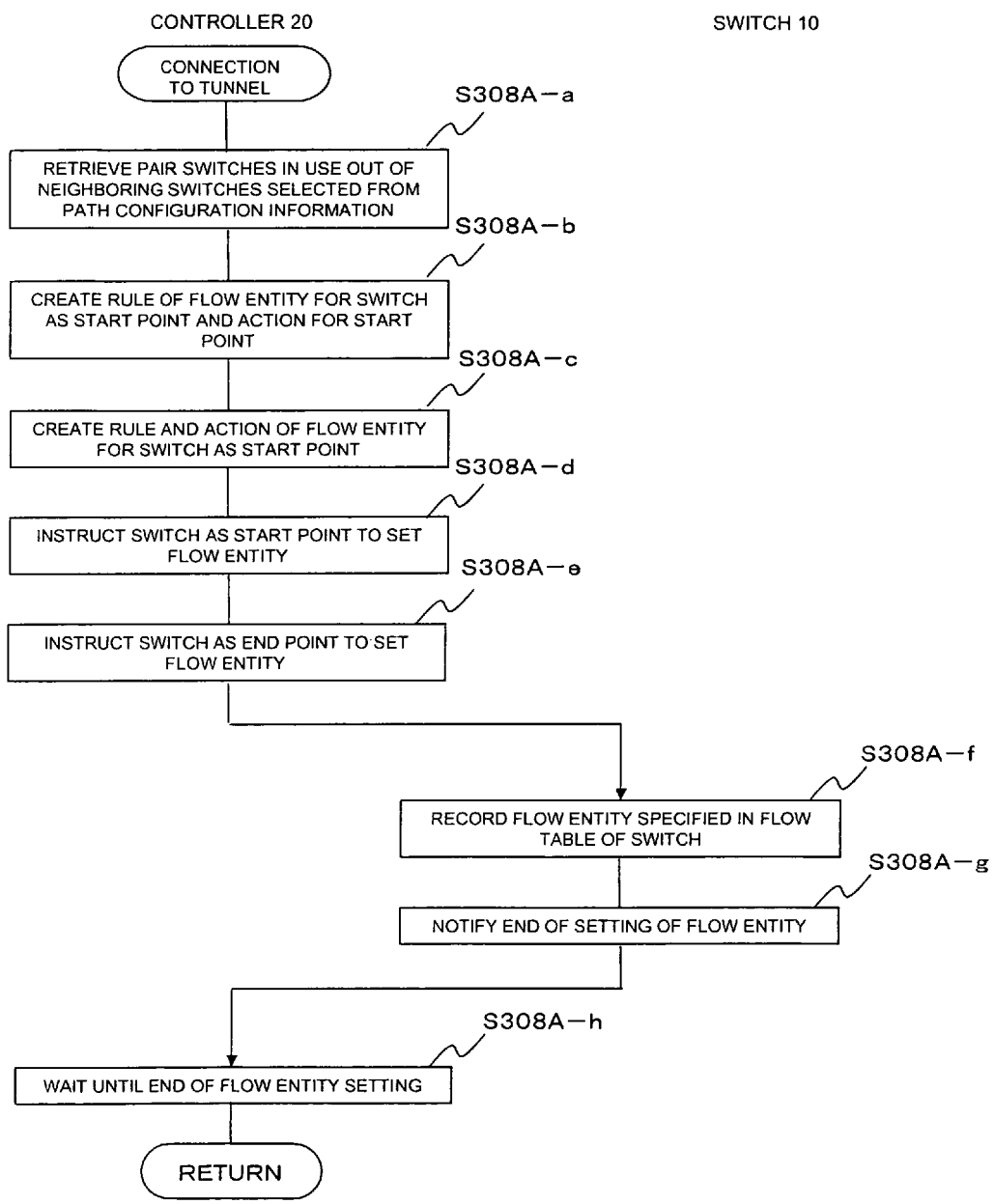
FIG. 21 is a flowchart for explaining the procedure of connection to the tunnel of S308 of FIG. 18.

The following describes the procedure for connection to tunnel in S308 of FIG. 18 with reference to FIG. 21.

a. The switch state changing unit 206 of the controller 20 retrieves, from the path configuration information, the pair switches among the neighboring switches that are selected in S303 of FIG. 18 and that are in use (step S308A-a).
b. The switch state changing unit 206 of the controller 20 creates a flow entity made up of a rule of an as-set flow entity stored for the switch as start point of the path configuration information and an action for the start point (step S308A-b).
c. The switch state changing unit 206 of the controller 20 creates a flow entity composed of an as-set flow entity rule stored for the switch as termination point of the path configuration information and an action. The action is for changing a MAC destination address to a MAC destination address stored in the path management table (see FIG. 3) of the valid path memory 203 (step S308A-c).
d. The switch state changing unit 206 of the controller 20 specifies, for the switch as a start point, the flow entity created in S308A-b, while instructing the flow entity setting unit 202 of the controller 20 to set the flow entity (step S308A-d).
e. The flow entity setting unit 202 of the controller 20 instructs a switch as an termination point to set the flow entity to be set in the switch specified in S308A-c (step S308A-e). The following f and g are the processing to be performed by the switch 10.
f. When the switch 10 is instructed from the controller 20 to set the flow entity, the flow entity setting unit 104 records the specified flow entity in the flow entity table 102 of the switch (step S308A-f).
g. The flow entity setting unit 104 of the switch 10 notifies the controller 20 of the end of the flow entity setting (step S308A-g). The following h is the operation to be performed by the controller 20.
h. The flow entity setting unit 202 of the controller 20 waits for the end of the flow entity setting as instructed in the steps S308A-d and e (step S308A-h).

<Deletion of Old Path from Start Point Switch>

Figure 22:
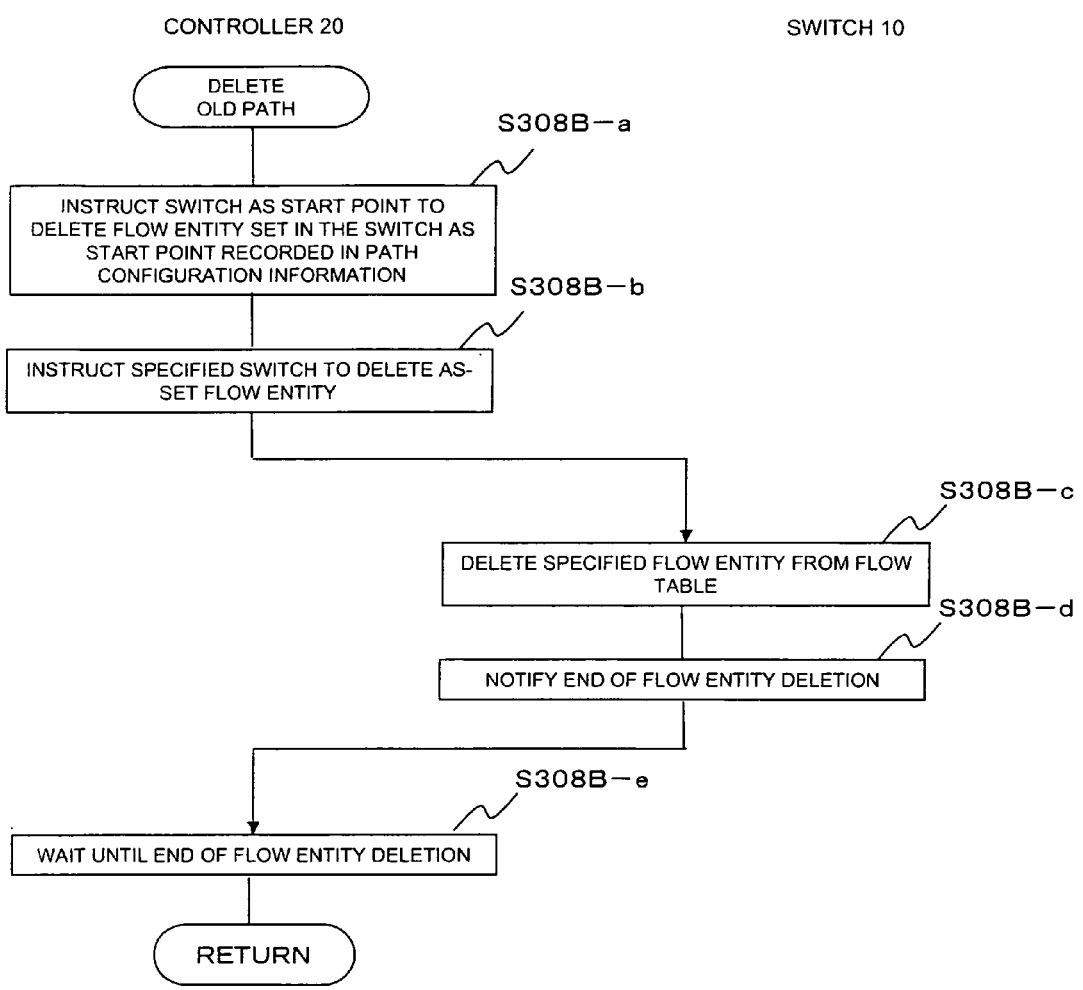
FIG. 22 is a flowchart for explaining the procedure of deletion of an old path at a start point of S308 of FIG. 18.

The following describes the deletion of the old path at the start point in S308 of FIG. 18 with reference to FIG. 22.

a. The switch state changing unit 206 of the controller 20 specifies, from the switch as a start point, the flow entity as set in the switch as the start point recorded in the path configuration information. The switch state changing unit 206 then instructs the flow entity setting unit 202 of the controller 20 to delete the flow entity in question (step S308B-a).

b. The flow entity setting unit of the controller 20 instructs the switch specified in S308B-a to delete the flow entity specified (step S308B-b). The following steps c and d are performed by the switch 10.

c. When the switch 10 is instructed from the controller 20 to delete the flow entity, the flow entity setting unit 104 deletes the flow entity specified from the flow entity table of the switch (step S308B-c).

d. The flow entity setting unit 104 of the switch 10 notifies the controller 20 of the end of flow entity deletion (step S308B-d). The following e is the operation performed by the controller 20.

e. The flow entity setting unit 202 of the controller 20 notifies the switch state changing unit 206 of the end of flow entity deletion (S308B-e).

In the present exemplary embodiment, in the switch as a start point of the tunnel, to guide a packet to the tunnel, the action of the flow entity is set to OUTPUT that connects to the next switch in the tunnel and the action of changing the MAC destination address of the packet header to the MAC address for the tunnel, and the old flow entity is deleted.

A flow entity including an action to change the MAC destination address of the packet header is added in the switch as the termination point of the tunnel.

<Flow Entity for Tunnel>

The following describes an example of the flow entity for a bypass (tunnel).

If, in the network of FIG. 6, the switch 4 is deleted, the switches neighboring to the switch 4 are switches 1, 2, 5 and 6.

(1) The tunnel is between switches 1 and 2. The path is switch 1→switch 3→switch 2. It is observed that two actions are set for the switch 1 at the start point, and that these two actions are defined by flow entities 1 and 2. However, it is of course possible to set a plurality of actions for a single flow entity. The flow entities of the path (tunnel) are composed as follows. Meanwhile, the flow entities of the path are in a list form only for representation sake, such that a data structure of the flow entities forming the path (flow entities of the path configuration information of FIG. 3) may be arbitrary. For example, it may be in a table or linear list form.

((flow entity 1 <for a start point>
  switch 1
  rule (pre-set rule)
  action (change of the MAC destination address: MAC address for tunnel 1))
(floating entity 2 <for a start point>
  switch 1
  rule (pre-set rule)
  action (OUTPUT: interface 2))
(flow entity 3
  switch 3
  rule (MAC destination address=MAC address for tunnel 1)
  action (OUTPUT: interface 2))
(flow entity 4 <to be added to the termination point>
  switch 2
  rule (pre-set rule)
  action (MAC destination address change: MAC destination address stored in the path management table)))

In the action of the flow entity of the switch 1 as a start point of the tunnel, the MAC destination address of a packet header which the switch 1 outputs to the interface 2, is to be changed to the MAC address 1 for tunnel (local address). As the action of the flow entity of the switch 1, SET_DL_DST of FIG. 26 (update MAC destination address) is set. The pre-set rule is a rule already set as the flow entity rule.

In the switch 3 inside the tunnel, the MAC destination address of the header of the input packet is forwarded, in case the address is coincident with the MAC address 1 for tunnel, as specified in the rule of the flow entity.

In the action of the flow entity, added to the switch 2 at the tunnel end point, the destination address of the header of the packet entered from the switch 1 to the switch 2 via the tunnel of the switch 3 is restored from the MAC address for the tunnel to the original MAC destination address. In the action of the flow entity of switch 2, SET_DL_DST (update MAC destination address: original MAC address) of FIG. 26 is set. As the original MAC destination address, the MAC destination address, stored in the packet header information of the path management table (see FIG. 3) of the valid path memory 203 is used.

(2) In case the tunnel is provided between the switches 1 and 5, the path is switch 1→switch 3→switch 5. The flow entities of this path (tunnel) are as follows:

((flow entity 1 <for start point>
  switch 1
  rule (pre-set rule)
  action (MAC destination address change: MAC address for tunnel 2))
(flow entity 1 <for start point>
  switch 1
  rule (pre-set rule)
  action (OUTPUT: interface 2))
(flow entity 3
  switch 3
  rule (MAC destination address=MAC address 2 for tunnel)
  action (OUTPUT: interface 3)
(flow entity 4 <to be added to the end point>
  switch 5
  rule (pre-set rule)
  action (MAC destination address change: MAC destination address stored in the path management table))

In the action of the flow entity of the switch 1 as the start point of the tunnel, the destination MAC address of the packet header, the switch 1 outputs at the interface 2, is changed to the MAC address for tunnel 2 (local address). As the action of the flow entity of the switch 1, SET_DL_DST (update MAC destination address) of FIG. 26 is set.

The switch 3 forwards a packet, if the MAC destination address of the packet header coincides with the MAC address 2 for tunnel, as specified in the rule.

With the action of the flow entity, added to the switch 5 at the tunnel end point, the MAC address of the destination of the packet header entered to the switch 5 via the tunnel of the switches 1, 3 and 5 is restored from the MAC address for tunnel 2 to the original MAC address. In the action of the flow entity of the switch 5, SET_DL_DST (update MAC destination address; original MAC address) of FIG. 26 is set. In the flow entities of the respective tunnels, shown as examples in (3) to (12) below, the contents of the rules and actions of the start point, mid point and the end point of the tunnel may be understood in similar manner and hence are not explained.

(3) In case a tunnel is provided between the switch 1 and the switch 6, the path is switch 1→switch 3→switch 6. The flow entities of the present path (tunnel) are as follows:

((flow entity 1 (for start point)
  switch 1
  rule (pre-set rule)
  action (MAC destination address change: MAC address for tunnel 3))
(flow entity 1 (for start point)
  switch 1
  rule (pre-set rule)
  action (OUTPUT: interface 2))

(flow entity 3
   switch 3
   rule (MAC destination address=MAC address for tunnel 3)
   action (OUTPUT: interface 4))
(flow entity 4 (to be added to the end point)
   switch 6
   rule (pre-set rule)
   action (MAC destination address change: MAC destination address stored in path management table)))
(4) In case a tunnel is provided between switch 2 and switch 1, the path is: switch 2→switch 3→switch 1. The flow entities of the present path (tunnel) are as follows:
((flow entity 1 (for a start point)
   switch 2
   rule (pre-set rule)
   action (MAC destination address change: MAC address for tunnel 4))
(flow entity 2 (for a start point)
   switch 2
   rule (pre-set rule)
   action (OUTPUT: interface 2)
(flow entity 3
   switch 3
   rule (MAC destination address=MAC address for tunnel 4)
   action (OUTPUT: interface 1))
(flow entity 4 (to be added for a start point)
   switch 1
   rule (pre-set rule)
   action (MAC destination address change: MAC destination address stored in the path management table)))
(5) In case a tunnel is provided between the switch 2 and the switch 5, the path is: switch 2→switch 3→switch 5. The flow entities of the present path are as follows:
((flow entity 1 (for start point)
   switch 2
   rule (pre-set rule)
   action (MAC destination address change: MAC address for tunnel 5))
(flow entity 2 (for start point)
   switch 2
   rule (pre-set rule)
   action (OUTPUT: interface 2))
(flow entity 3
   switch 3
   rule (MAC destination address=MAC address for tunnel 3)
   action (OUTPUT: interface 3))
(flow entity 4 (to be added to the end point)
   switch 5
   rule (pre-set rule)
   action (MAC destination address change: MAC destination address stored in the path management table))
(6) In case a tunnel is provided between the switch 2 and the switch 6, the path is: switch 2→switch 3→switch 6. The flow entities for this path (tunnel) are as follows:
((flow entity 1 (for start point)
   switch 2
   rule (pre-set rule)
   action (MAC destination address change: MAC address for tunnel 6))
(flow entity 2 (for start point)
   switch 2
   rule (pre-set rule)
   action (OUTPUT: interface 2)
(flow entity 3
   switch 3
   rule (MAC destination address=MAC address for tunnel 6)
   action (OUTPUT: interface 4))
(flow entity 4 (to be added to the end point)
   switch 6
   rule (pre-set rule)
   action (MAC destination address change: MAC destination address stored in the path management table)))
(7) In case a tunnel is provided between the switch 5 and the switch 1, the path is: switch 5→switch 3→switch 1. The flow entities of the present path (tunnel) are as follows:
((flow entity 1 (for start point)
   switch 5
   rule (pre-set rule)
   action (MAC destination address change: MAC address for tunnel 7))
(flow entity 2 (for start point)
   switch 5
   rule (pre-set rule)
   action (OUTPUT: interface 1))
(flow entity 3
   switch 3
   rule (MAC destination address=MAC address for tunnel 7)
   action (UTPUT: interface 1))
(flow entity 4 (to be added to the end point)
   switch 1
   rule (pre-set rule)
   action (MAC destination address change: MAC destination address stored in the path management table)))
(8) In case a tunnel is provided between the switch 5 and the switch 2, the path is: switch 5→switch 3→switch 2. The flow entities of the present path (tunnel) are as follows:
((flow entity (for start point)
   switch 5
   rule (pre-set rule)
   action (MAC destination address change: MAC address for tunnel 8))
(flow entity 2 (for start point)
   switch 5
   rule (pre-set rule)
   action (OUTPUT: interface 1))
(flow entity 3
   switch 3
   rule (MAC destination address=MAC address 8 for tunnel)
   action (OUTPUT: interface 2)
(flow entity 4 (to be added to the end point)
   switch 2
   rule (pre-set rule)
   action (MAC destination address change: MAC destination address stored in the path management table))
(9) In case a tunnel is provided between the switch 5 and the switch 6, the path is: switch 5→switch 3→switch 6. The flow entities of this path (tunnel) are as follows:
((flow entity 1 (for start point)
   switch 5
   rule (pre-set rule)
   action (MAC destination address change: MAC address for tunnel 9)
((flow entity 2 (for start point)
   switch 5
   rule (pre-set rule)
   action (OUTPUT: interface 1))
(flow entity 3
   switch 3
   rule (MAC destination address change: MAC destination address=MAC address for tunnel 9)
   action (OUTPUT: interface 4))

(flow entity 4 (to be added at an end point)
  switch 6
  rule (pre-set rule)
  action (MAC destination address change: MAC destination address stored in path management table)))
(10) In case a tunnel is provided between the switch 6 and the switch 1, the path is: switch 6→switch 3→switch 1. The flow entities of the present path (tunnel) are as follows:
((flow entity 1 (for start point)
  switch 6
  rule (pre-set rule)
  action (MAC destination address change: MAC address for tunnel 10))
(flow entity 2 (for start point)
  switch 6
  rule (pre-set rule)
  action (OUTPUT: interface 1))
(flow entity 3
  switch 3
  rule (MAC destination address=MAC address for tunnel 10)
  action (OUTPUT: interface 1))
(flow entity 4 (to be added to the end point)
  switch 1
  rule (pre-set rule)
  action (MAC destination address change: MAC destination address stored in the path management table)))
(11) In case a tunnel is provided between the switch 6 and the switch 2, the path is: switch 6→switch 3→switch 2. The flow entities of the present path (tunnel) are as follows:
((flow entity 1 (for start point)
  switch 6
  rule (pre-set rule)
  action (MAC destination address change: MAC address for tunnel 11)
(flow entity 2 (for start point)
  switch 6
  rule (pre-set rule)
  action (OUTPUT: interface 1))
(flow entity 3
  switch 3
  rule (MAC destination address=MAC address for tunnel 11)
  action (OUTPUT: interface 2))
(flow entity 4 (to be added to the end point)
  switch 2
  rule (pre-set rule)
  action (MAC destination address change: MAC destination address stored in the path management table)))
(12) In case a tunnel is provided between the switch 6 and the switch 5, the path is: switch 6→switch 3→switch 5. The flow entities of the present path (tunnel) are as follows:
((flow entity 1 (for start point)
  switch 6
  rule (pre-set rule)
  action (MAC destination address change: MAC address for tunnel 12))
(flow entity 2 (for start point)
  switch 6
  rule (pre-set rule)
  action (OUTPUT: interface 1))
(flow entity 3
  switch 3
  rule (MAC destination address=MAC address for tunnel 12)
  action (OUTPUT: interface 3))
(flow entity 4 (to be added to the end point)
  switch 5
  rule (pre-set rule)
  action (MAC destination address change: MAC destination address stored in the path management table))

<Change of Flow Entity>

The following describes an example of flow entity change in the present exemplary embodiment.

It is assumed that values set in the fields of the switch information and the packet header information of the path management table (see FIG. 3) are as follow. The network is assumed to have the configuration of FIG. 6.

Switch information: switch 1; and
Packet header information:
MAC source address: MAC address of node A;
MAC destination address: MAC address of node D:
Protocol: TCP;
Source IP address: IP address of node A;
Destination IP address: IP address of node D;
Source port number: pre-set value; and
Destination port number: pre-set value.

In the foregoing, the 'pre-set value' means a value as already set at a time point prior to flow entity change.

An example of change of flow entities in case of bypassing the switch 4 is shown below. It is assumed that a tunnel between the switches 1 and 6 and a tunnel between the switches 6 and 1 are used.

<Flow Entities Before Change (Before Setting a Bypass Tunnel)>
((flow entity 1
  switch 1
  rule (destination IP address=IP address of node D)
  action (OUTPUT: interface 3))
(flow entity 2
  switch 4
  rule (destination IP address D=IP address of node D)
  action (OUTPUT: interface 4))
(flow entity 3
  switch 6
  rule (destination IP address=IP address of node D)
  action (OUTPUT: interface 4))
(flow entity 4
  switch 8
  rule (destination IP address=IP address of node D)
  action (OUTPUT: interface 3))
(flow entity 5
  switch 8
  rule (destination IP address=IP address of node A)
  action (OUTPUT: interface 2))
(flow entity 6
  switch 6
  rule (destination IP address=IP address of node A)
  action (OUTPUT: interface 2))
(flow entity 7
  switch 4
  rule (destination IP address=IP address of node A)
  action (OUTPUT: interface 1))
(flow entity 8
  switch 1
  rule (destination IP address=IP address of node A)
  action (OUTPUT: interface 1))

An example of change of the flow entity after setting a bypass tunnel is shown.

<Flow Entities After Change (After Setting of Bypass Path)>
((flow entity 9 (added)
switch 1
   rule (destination IP address=IP address of node D)
   action (MAC destination address change: MAC address for tunnel 3))
(flow entity 1 (changed)
   switch 1
   rule (destination IP address=IP address of node D)
   action (OUTPUT: interface 2))
(flow entity 2 (deleted)
   switch 4
   rule (destination IP address=IP address of node D)
   action (OUTPUT: interface 4))
(flow entity 10 (added))
   switch 6
   rule (destination IP address=IP address of node D)
   action (MAC destination address change: MAC address of node D)
(flow entity 3
   switch 6
   rule (destination IP address=IP address of node D)
   action (OUTPUT: interface 4))
(flow entity 4
   switch 8
   rule (destination IP address=IP address of node D)
   action (OUTPUT: interface 3))
(flow entity 5
   switch 8
   rule (destination IP address=IP address of node A)
   action (OUTPUT: interface 2))
(flow entity 11 (added)
   switch 6
   rule (destination IP address=IP address of node A)
   action (MAC destination address change: MAC address for tunnel 10))
(flow entity 6 (changed)
   switch 6
   rule (destination IP address=IP address of node A)
   action (OUTPUT: interface 1))
(flow entity 7 (deleted)
   switch 4
   rule (destination IP address=IP address of node A)
   action (OUTPUT: interface 1))
(flow entity 8
   switch 1
   rule (destination IP address=IP address of node A)
   action (OUTPUT: interface 1))
(flow entity 12 (added)
   switch 1
   rule (destination IP address=IP address of node A)
   action (MAC destination address change: MAC address 10 for node A))

A flow entity (added) means that the flow entity is added to the flow entity table 102 of the switch 10. A flow entity (deleted) means that the flow entity is deleted from the flow entity table of the switch 10 and from the path configuration information of the valid path memory 203 of the controller 20.

If a single flow entity includes a plurality of actions, it is possible to add only the action (MAC destination address change: MAC address 10 of node A) of the flow entity 12 which is added to the switch 1, to the action (OUTPUT: interface 1) of the original flow entity 8 of the switch 1 to yield (flow entity 8
   switch 1
   rule (destination IP address=IP address of node A)
   action (OUTPUT: interface 1)), action (MAC destination address change: MAC address 10 of node A)).

<Bypassing Cancel>
The following describes the operation after bypassing cancel (that is, after restoration of the bypass switch) in the present exemplary embodiment will now be explained. In canceling the bypassing, the controller 20 adds a switch, which has now become usable, for example, the switch 4 specified as the bypass switch, to the topology information 204. Path changes following the bypassing cancel are not essential. In adding a switch deleted to the topology information, the path of the tunnel, created for bypassing, is deleted from the valid path memory 203 in case two conditions are met. These conditions are as follows:

There exists no path configuration information that uses the bypassing tunnel; and The path configuration information that uses the bypass tunnel has been deleted in its entirety.

<Deletion of the Path Configuration Information>

Figure 23:
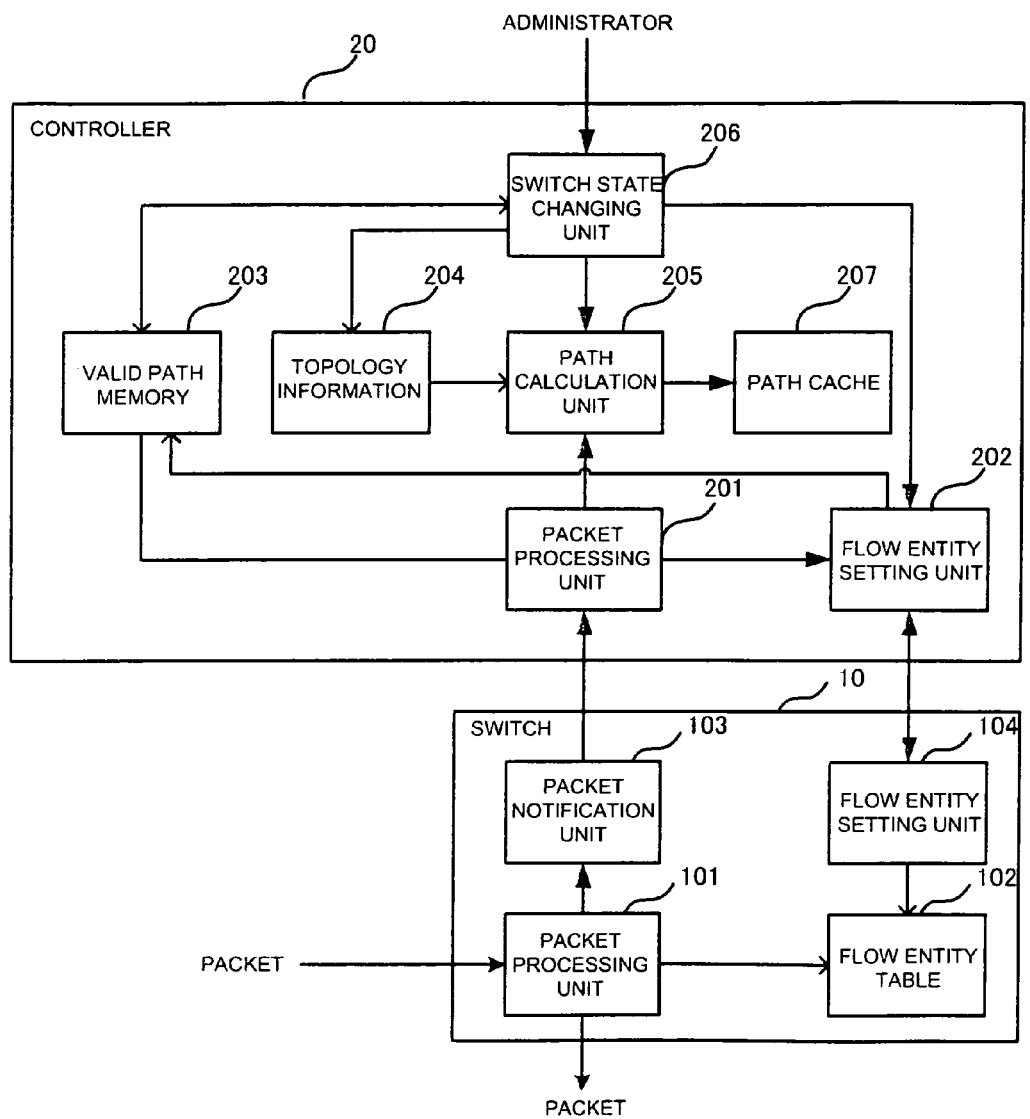
FIG. 23 is a diagram showing a configuration of controller and a switch according to a further exemplary embodiment of the present invention.

FIG. 23 is a diagram illustrating another exemplary embodiment of the present invention. In the present exemplary embodiment, the flow entity setting unit 202 of the controller 20 has the function of deleting the path configuration information from the valid path memory 203.

If there is no incoming packet which matches to the rule of a flow entity during the time prescribed by a system, such a flow entity becomes invalid. The path configuration information on the path management table (see FIG. 3) of the valid path memory 203 as well as the relevant entry in the path management table is deleted. The procedure for this case will now be explained.

1. If the flow entity of the switch has become invalid, the flow entity setting unit 104 of the switch deletes the relevant flow entity from the flow entity table 102.

2. The flow entity setting unit 104 of the switch notifies to the flow entity setting unit 202 of the controller 20 that the flow entity has become invalid, as the flow entity setting unit 104 specifies the flow entity deleted.

3. The flow entity setting unit 202 of the controller 20 searches the valid path memory 203 for the path configuration information that uses the relevant flow entity.

4. In case, as a result of the retrieval, there is no such information, processing ends.

5. In case, as a result of the retrieval, there is such information, the flow entity setting unit 202 of the controller 20 saves the relevant path configuration information.

6. The flow entity setting unit 202 of the controller 20 deletes, from the valid path memory 203, the path configuration information in question and entries on the path management table (see FIG. 3) having a pointer to the path configuration information in question. Each entry is made up of the switch information, the packet header information and the pointer.

7. Based upon the path configuration information saved in step 5, the flow entity setting unit 202 of the controller 20 specifies, for each switch 10, the flow entity associated with the switch, and instructs each switch to delete the flow entity.

In the above exemplary embodiments, in which a path that does not pass the switch commanded to be bypassed is calculated and set, it is possible to bypass the switch to allow its maintenance operation to be performed. Moreover, by having the switch bypassed, biased or offset routing may be accomplished to provide for low power consumption. That is, during the nighttime, operations with low power consumption, for example, may be performed. If a path cache is provided, path calculations may be accomplished at a fast speed.

If, in the above exemplary embodiments, a tunnel priority is set at a lower value, it is possible to avoid any adverse effect on flows explicitly demonstrated on the switch.

In re-calculating a bypass path, path setting may be made to reduce the number of flows affected by the bypassing. In this case, the number of flows re-established at the time of bypassing may be reduced. In re-calculating a bypass path, path setting may also be made such as to reduce the number of switches that change flows.

In the above exemplary embodiment, such a case where, in the network of FIG. 6, a single switch (switch 4) is specified as the bypass switch has been taken up to simplify the explanation. However, the present invention may, as a matter of course, be applied to such a case where a plurality of switches are bypassed. It is noted that, in the present invention, the node may include not only the switch (OFS) of the exemplary embodiment but also any suitable optional switches, the flow control for which is exercised by the controller, such as L2 or L3 switch, or a router.

Although the description has been made of exemplary embodiments of the present invention, such exemplary embodiments are given only by way of illustration and are not intended to limit the scope of the present invention. The controller 20 of the above exemplary embodiment may also be implemented by a dedicated server. The switch 10 may not only be above OFS (OpenFlow Switch) but may also be a node such as router in an IP network or an MPLS (Multi-Protocol Label Switching) switch in the MPLS network. In addition, the present invention may be applied if the network is such a one in which a controller may perform concentrated management of the nodes included in the network.

The disclosure of the aforementioned Patent Document 1 is incorporated by reference herein. The particular exemplary embodiments or examples may be modified or adjusted within the range of the entire disclosure of the present invention, inclusive of claims, based on the fundamental technical concept of the invention. Further, a variety of combinations or selection of elements disclosed herein may be made within the framework of the claims. In short, the present invention may encompass a variety of modifications or corrections that may occur to those skilled in the art in accordance with and within the range of the entire disclosure of the present invention, inclusive of claims and the technical concept of the present invention.

What is claimed is:

1. A network system comprising:
a controller;
a plurality of nodes, a flow at each of which is controlled by said controller,
wherein:
said controller, responsive to a command supplied thereto,
removes a node commanded to be bypassed from topology information that prescribes a network configuration of said plurality nodes,
calculates a new path not passing said node commanded to be bypassed,
creates flow information that prescribes operation, at each of said plurality of nodes forming said new path, on an associated flow,
sets said flow information in each of said plurality of nodes forming said new path; and
a branch node coupled to the new path and to an old path, wherein:
the old path traverses from the branch node to the node commanded to be bypassed,
the controller directs the branch node to transmit one or more packets to the new path,
the controller directs the branch node to transmit the one or more packets to the old path until the old path is deleted, and
the controller subsequently deletes the old path.

2. The network system according to claim 1, wherein said controller deletes said node commanded to be bypassed from said topology information,
said controller finds, for each of old paths that uses said node to be bypassed, a new path that does not pass said node to be bypassed, to store said new path in a valid path memory that stores therein valid path information,
said controller creates said flow information on each node forming said new path,
said controller sets said flow information in each node forming said new path, and
said controller deletes said old path that uses said node to be bypassed from said valid path memory.

3. A network system comprising:
a controller; and
a plurality of nodes, a flow at each of which is controlled by said controller,
wherein:
said controller, responsive to a command supplied thereto,
removes a node commanded to be bypassed from topology information that prescribes a network configuration of said plurality nodes,
calculates a new path not passing said node commanded to be bypassed,
creates flow information that prescribes operation, at each of nodes forming said new path, on an associated flow,
sets said flow information in each of said nodes forming said new path, wherein said controller deletes said node commanded to be bypassed from said topology information, and
said controller finds, for each of old paths that uses said node to be bypassed, a new path that does not pass said node to be bypassed to save said new path in a valid path memory that stores therein valid path information,
said controller creates flow information at each of said nodes forming said new path to set said flow information in each of said nodes forming said new path,
said controller sets a packet arriving at a leading end node, from which said new path and said old path that uses said node to be bypassed are branched, so as to be transmitted to both said new path and said old path, and
said controller thereafter deletes said old path from said valid path memory.

4. The network system according to claim 3, wherein in deleting said old path, said controller sequentially deletes flows from said leading end node of said old path, and
said controller cancels replication setting of a packet at said leading end node to forward said packet to both said new path and said old path, when deletion of said flows from said leading end node is completed.

5. The network system according to claim 1, wherein in case a node to be bypassed is specified,
said controller establishes a tunnel path having, as a start point and an end point, at least two nodes neighboring to said node to be bypassed,
said controller creates and sets flow information for each of said nodes on said tunnel path, said node at said start point of said tunnel path, based on said flow information set by said controller, rewrites a transmission destination in a header of a packet that is received by said node at said start point of said tunnel and that is to be forwarded on a path that passes said node to be bypassed, to an address of said tunnel so that said packet is forwarded into said tunnel, said packet being forwarded through said tunnel, and said node at said end point of said tunnel, based on said flow information set by said controller, restores said transmission destination of said header of said packet forwarded through said tunnel and received by said node at said end point of said tunnel to an original transmission destination to have said packet forwarded.

6. The network system according to claim 5, wherein said controller deletes said tunnel path created for bypassing, after path configuration information that uses said tunnel for bypassing is deleted, in case after canceling bypassing, there exists no path configuration information that uses said bypass tunnel.

7. A network system comprising:
a controller; and
a plurality of nodes, a flow at each of which is controlled by said controller, wherein
said controller, responsive to a command supplied thereto,
removes a node commanded to be bypassed from topology information that prescribes
a network configuration of said plurality nodes,
calculates a new path not passing said node commanded to be bypassed,
creates flow information that prescribes operation, at each of nodes forming said new path, on an associated flow, and
sets said flow information in each of said nodes forming said new path, wherein said controller includes:
path configuration information for each of nodes of respective points from said start point to said end point of each path, said path configuration information including:
identification information for each of said nodes; and
flow information that is to be set at each of said nodes, and
said controller further includes:
a path management table used to manage said path configuration information, for each of said paths, said path management table including:
information of said nodes that form said path;
information of a packet header that serves as a trigger for said controller to create said path; and
pointer information that points to said path configuration information of a corresponding path.

8. The network system according to claim 1, wherein said flow information at least includes:
a rule that is matched to a header of a packet received by said node; and
an action that prescribes operation including forwarding by said node of a packet that matches to said rule, wherein
in case said header of said packet received by said node fails to match to said rule of said flow information, said node forwards said packet to said controller,
said controller decides on a flow of said packet received to set said flow information for said node on said flow, and
said controller returns said packet to said node as a transmission source of said packet or to a node out of said nodes connected to said controller, said node being on a path on which said packet is transferred and which is closer to said node of a transmission destination of said packet than to said node of said transmission source of said packet.

9. A network system comprising:
a controller; and
a plurality of nodes, a flow at each of which is controlled by said controller, wherein
said controller, responsive to a command supplied thereto,
removes a node commanded to be bypassed from topology information that prescribes a network configuration of said plurality nodes,
calculates a new path not passing said node commanded to be bypassed,
creates flow information that prescribes operation, at each of nodes forming said new path, on an associated flow, and
sets said flow information in each of said nodes forming said new path, wherein said controller includes:
a path cache that stores therein, as one cache entry, two termination points including a start point and an end point of a path, and a plurality of nodes on said path, as path information; and
a path calculation unit that calculates a path, wherein
said path calculation unit, in calculating a path, specifies a start point and an end point to retrieve said path cache for a path having both ends coincident with said specified points, and
if there is found such a path having both ends coincident with said specified points, said path calculation unit takes said path to be a calculated path, and if there is found no path having both ends coincident with said specified points, said controller calculates a path having both ends coincident with said specified points to store information on said path calculated in said path cache.

10. A method for controlling a network by a controller that exercises flow control on a plurality of nodes on said network, said method comprising:
removing a node commanded to be bypassed from topology information that prescribes a network configuration of said plurality nodes;
calculating a new path not passing node commanded to be bypassed that prescribes a network configuration of said plurality nodes;
creating flow information that prescribes operation, at each of nodes forming said new path, on an associated flow;
setting said flow information in each of said nodes forming said new path;
directing a branch node to transmit one or more packets to the new path;
directing the branch node to transmit the one or more packets to an old path until the old path is deleted; and
subsequently deleting the old path,
wherein the branch node is coupled to the new path and to the old path, and
wherein the old path traverses from the branch node to the node commanded to be bypassed.

11. The method according to claim 10, further comprising:
in case a node to be bypassed is specified,
deleting said node commanded to be bypassed from said topology information;
finding, for each of old paths that uses said node to be bypassed, a new path that does not pass said node to be bypassed, to store said new path in a valid path memory that stores therein valid path information;
creating flow information on each node forming said new path;
setting said flow information in each node forming said new path; and
deleting said old path that uses said node to be bypassed from said valid path memory.

12. A method for controlling a network by a controller that exercises flow control on a plurality of nodes on said network, said method comprising:
- removing a node commanded to be bypassed from topology information that prescribes a network configuration of said plurality nodes;
- calculating a new path not passing node commanded to be bypassed that prescribes a network configuration of said plurality nodes;
- creating flow information that prescribes operation, at each of nodes forming said new path, on an associated flow; and
- setting said flow information in each of said nodes forming said new path, said method further comprising:
- in case a node to be bypassed is specified,
- deleting said node commanded to be bypassed from said topology information;
- finding, for each of old paths that uses said node to be bypassed, a new path that does not pass said node to be bypassed to save said new path in a valid path memory that stores therein valid path information;
- creating flow information at each of said nodes forming said new path to set said flow information in each of said nodes forming said new path;
- setting a packet arriving at a leading end node, from which said new path and said old path that uses said node to be bypassed are branched, so as to be transmitted to both said new path and said old path; and
- deleting said old path from said valid path memory.

13. The method according to claim 12, further comprising:
- in deleting said old path,
- sequentially deleting flows from said leading end node of said old path; and
- cancelling replication setting of a packet at said leading end to forward said packet to both said new path and said old path, when deletion of said flows from said leading end node is completed.

14. The method according to claim 10, further comprising:
- establishing a tunnel path having, as a start point and an end point, at least two nodes neighboring to said node to be bypassed,
- creating and sets flow information for each of said nodes on said tunnel path,
- said node at said start point of said tunnel path, based on said flow information set by said controller, rewriting a transmission destination in a header of a packet that is received by said node at said start point of said tunnel and that is to be forwarded on a path that passes said node to be bypassed, to an address of said tunnel so that said packet is forwarded into said tunnel, said packet being forwarded through said tunnel; and
- said node at said end point of said tunnel, based on said flow information set by said controller, restoring said transmission destination of said header of said packet forwarded through said tunnel and received by said node at said end point of said tunnel to an original transmission destination to have said packet forwarded.

15. The method according to claim 14, further comprising:
- deleting said tunnel path created for bypassing, after path configuration information that uses said tunnel for bypassing is deleted, in case, after canceling bypassing, there exists no path configuration information that uses said bypass tunnel.

16. A method for controlling a network by a controller that exercises flow control on a plurality of nodes on said network, said method comprising:
- removing a node commanded to be bypassed from topology information that prescribes a network configuration of said plurality nodes;
- calculating a new path not passing node commanded to be bypassed that prescribes a network configuration of said plurality nodes;
- creating flow information that prescribes operation, at each of nodes forming said new path, on an associated flow; and
- setting said flow information in each of said nodes forming said new path, wherein said controller includes:
- path configuration information, for each of nodes of respective points from said start point to said end point of each path, said path configuration information including:
- identification information for each of said nodes; and
- flow information that is to be set at each of said nodes, and said controller further includes:
- a path management table used to manage said path configuration information, for each of said paths, said path management table including:
- information of said nodes that form said path;
- information of a packet header that serves as a trigger for said controller to create said path; and
- pointer information that points to said path configuration information of a corresponding path.

17. The method according to claim 10, wherein said flow information at least includes:
- a rule that is matched to a header of a packet received by said node; and
- an action that prescribes operation including forwarding by said node of a packet that matches to said rule, said method comprising:
  - in case said header of said packet received by said node fails to match to said rule of said flow information, said node forwarding said packet to said controller,
  - said controller deciding on a flow of said packet received to set said flow information for said node on said flow; and
  - said controller returning said packet to said node as a transmission source of said packet or to a node out of said nodes connected to said controller, said node being on a path on which said packet is transferred and which is closer to said node of a transmission destination of said packet than to said node of said transmission source of said packet.

18. A method for controlling a network by a controller that exercises flow control on a plurality of nodes on said network, said method comprising:
- removing a node commanded to be bypassed from topology information that prescribes a network configuration of said plurality nodes;
- calculating a new path not passing node commanded to be bypassed that prescribes a network configuration of said plurality nodes;
- creating flow information that prescribes operation, at each of nodes forming said new path, on an associated flow; and
- setting said flow information in each of said nodes forming said new path, wherein said controller includes:
- a path cache that stores therein, as one cache entry, two termination points including a start point and an end point of a path, and a plurality of nodes on said path, as path information; and
- a path calculation unit that calculates a path, said method comprising:

said path calculation unit, in calculating a path, specifying a start point and an end point to retrieve said path cache for a path having both ends coincident with said specified points; and if there is found such a path having both ends coincident with said specified points, said path calculation unit taking said path to be a calculated path, and if there is found no path having both ends coincident with said specified points, said controller calculates a path having both ends coincident with said specified points to store information on said path calculated in said path cache.

19. A controller that exercises flow control on a plurality of nodes, said controller comprising:
a storage unit that stores therein topology information that prescribes a network configuration of said plurality nodes;
a valid path memory that stores therein valid path information; and
a state changing unit that responsive to a command supplied thereto, removes a node commanded to be bypassed from topology information that prescribes a network configuration of said plurality nodes,
a path calculation unit that calculates a new path not passing said node commanded to be bypassed to store said new path calculated in said valid path memory,
said path calculation unit creating flow information that prescribes operation, at each of nodes foaming said new path, on an associated flow, and
a flow setting unit that sets said flow information in each of said nodes forming said new path; and
a branch node coupled to the new path and to an old path, wherein:
the old path traverses from the branch node to the node commanded to be bypassed,
the controller directs the branch node to transmit one or more packets to the new path,
the controller directs the branch node to transmit the one or more packets to the old path until the old path is deleted, and
the controller subsequently deletes the old path.

20. The controller according to claim 19, wherein said state changing unit deletes said node commanded to be bypassed from said topology information,
said path calculation unit finds, for each of old paths that uses said node to be bypassed, a new path that does not pass said node to be bypassed, to store said new path in said valid path memory,
said path calculation unit creates said flow information on each node forming said new path,
said flow setting unit sets said flow information in each node forming said new path, and
said state changing unit deletes said old path that uses said node to be bypassed from said valid path memory.

21. A controller that exercises flow control on a plurality of nodes, said controller comprising:
a storage unit that stores therein topology information that prescribes a network configuration of said plurality nodes;
a valid path memory that stores therein valid path information; and
a state changing unit that responsive to a command supplied thereto, removes a node commanded to be bypassed from topology information that prescribes a network configuration of said plurality nodes,
a path calculation unit that calculates a new path not passing said node commanded to be bypassed to store said new path calculated in said valid path memory,
said path calculation unit creating flow information that prescribes operation, at each of nodes forming said new path, on an associated flow, and
a flow setting unit that sets said flow information in each of said nodes forming said new path, wherein in case a node to be bypassed is specified,
said state changing unit deletes said node specified to be bypassed from said topology information,
said path calculation unit finds, for each of old paths that uses said node to be bypassed, a new path that does not pass said node to be bypassed to save said new path in a valid path memory that stores therein valid path information,
said path calculation unit creates flow information at each of said nodes forming said new path to set said flow information in each of said nodes forming said new path,
said flow setting unit sets said flow information in said nodes including at least a leading end node, from which said new path and said old path that uses said node to be bypassed are branched, such that a packet arriving at leading end node is transmitted to both said new path and said old path, and
said state changing unit thereafter deletes said old path from said valid path memory.

22. The controller according to claim 21, wherein in deleting said old path, said state changing unit sequentially deletes flows from said leading end node of said old path, and
said state changing unit controls via said flow setting unit said leading end to cancel replication setting of a packet at said leading end to forward said packet to both said new path and said old path, when deletion of said flows from said leading end node is completed.

23. The controller according to claim 19, wherein in case a node to be bypassed is specified,
said state changing unit establishes a tunnel path having, as a start point and an end point, at least two nodes neighboring to said node to be bypassed,
said path calculation unit creates and sets flow information for each of said nodes on said tunnel path,
said node at said start point of said tunnel path, based on said flow information set by said controller, rewriting a transmission destination in a header of a packet that is received by said node at said start point of said tunnel and that is to be forwarded on a path that passes said node to be bypassed, to an address of said tunnel so that said packet is forwarded into said tunnel, said packet being forwarded through said tunnel, and
said node at said end point of said tunnel, based on said flow information set by said controller, restoring said transmission destination of said header of said packet forwarded through said tunnel and received said node at said end point of said tunnel to an original transmission destination to have said packet forwarded.

24. The controller according to claim 23, wherein said state changing unit deletes said tunnel path created for bypassing, after deleting an entirety of path configuration information that use said tunnel for bypassing from said valid path memory, in case, after canceling bypassing, there exists no path configuration information that uses said bypass tunnel.

25. A controller that exercises flow control on a plurality of nodes, said controller comprising:
a storage unit that stores therein topology information that prescribes a network configuration of said plurality nodes;
a valid path memory that stores therein valid path information; and a state changing unit that responsive to a command supplied thereto, removes a node commanded to be bypassed from topology information that prescribes a network configuration of said plurality nodes, a path calculation unit that calculates a new path not passing said node commanded to be bypassed to store said new path calculated in said valid path memory, said path calculation unit creating flow information that prescribes operation, at each of nodes forming said new path, on an associated flow, and a flow setting unit that sets said flow information in each of said nodes forming said new path, said controller further comprising:

path configuration information, stored in said valid path memory, for each of nodes of respective points from said start point to said end point of each path, said path configuration information including:

identification information for each of said nodes; and flow information that is to be set at each of said nodes, and said controller further comprising:

a path management table used to manage said path configuration information, for each of said paths, said path management table stored in said valid path memory, said path management table including:

information of said nodes that form said path;

information of a packet header that serves as a trigger for said controller to create said path; and pointer information that points to said path configuration information of a corresponding path.

26. The controller according to claim 19, wherein said flow information at least includes a rule that is matched to a header of a packet received by said node; and an action that prescribes operation including forwarding by said node of a packet that matches to said rule, wherein in case said header of said packet received by said node fails to match to said rule of said flow information, said node forwards said packet to said controller, said controller decides on a flow of said packet received to set said flow information for said node on said flow, and said controller returns said packet to said node as a transmission source of said packet or to a node out of said nodes connected to said controller, said node being on a path on which said packet is transferred and which is closer to said node of a transmission destination of said packet than to said node of said transmission source of said packet.

27. A controller that exercises flow control on a plurality of nodes, said controller comprising:

a storage unit that stores therein topology information that prescribes a network configuration of said plurality nodes;

a valid path memory that stores therein valid path information; and a state changing unit that responsive to a command supplied thereto, removes a node commanded to be bypassed from topology information that prescribes a network configuration of said plurality nodes, a path calculation unit that calculates a new path not passing said node commanded to be bypassed to store said new path calculated in said valid path memory, said path calculation unit creating flow information that prescribes operation, at each of nodes forming said new path, on an associated flow, and a flow setting unit that sets said flow information in each of said nodes forming said new path, said controller further comprising:

a path cache that stores therein, as one cache entry, two termination points including a start point and an end point of a path, and a plurality of nodes on said path, as path information, wherein said path calculation unit, in calculating a path, specifies a start point and an end point to retrieve said path cache for a path having both ends coincident with said specified points, and if there is found such a path having both ends coincident with said specified points, said path calculation unit takes said path to be a calculated path, and if there is found no path having both ends coincident with said specified points, said controller calculates a path having both ends coincident with said specified points to store information on said path calculated in said path cache.

28. A non-transitory computer-readable recording medium storing therein a program that causes a computer that constitutes a controller exercising flow control for a plurality of nodes to execute the processing comprising:

removing a node commanded to be bypassed from topology information that prescribes a network configuration of said plurality nodes;

calculating a new path not passing said node commanded to be bypassed to store said new path calculated in a valid path memory;

creating flow information that prescribes operation, at each of nodes forming said new path, on an associated flow;

setting said flow information in each of said nodes forming said new path;

directing a branch node to transmit one or more packets to the new path;

directing the branch node to transmit the one or more packets to an old path until the old path is deleted; and subsequently deleting the old path, wherein the branch node is coupled to the new path and to the old path, and wherein the old path traverses from the branch node to the node commanded to be bypassed.

29. The non-transitory computer-readable recording medium according to claim 28, wherein said program causes said computer to execute the processing comprising:

in case a node to be bypassed is specified, deleting said node specified to be bypassed from said topology information;

finding, for each of old paths that uses said node to be bypassed, a new path that does not pass said node to be bypassed, to store said new path in said valid path memory;

creating flow information on each node forming said new path;

setting said flow information in each node forming said new path; and deleting said old path that uses said node to be bypassed from said valid path memory.

30. A non-transitory computer-readable recording medium storing therein a program that causes a computer that constitutes a controller exercising flow control for a plurality of nodes to execute the processing comprising:

removing a node commanded to be bypassed from topology information that prescribes a network configuration of said plurality nodes;

calculating a new path not passing said node commanded to be bypassed to store said new path calculated in a valid path memory;

creating flow information that prescribes operation, at each of nodes forming said new path, on an associated flow; and setting said flow information in each of said nodes forming said new path, wherein said program causes said computer to execute the processing comprising:
in case a node to be bypassed is specified, deleting said node specified to be bypassed from said topology information;
finding, for each of old paths that uses said node to be bypassed, a new path that does not pass said node to be bypassed to save said new path in a valid path memory that stores therein valid path information;
creating flow information at each of said nodes forming said new path to set said flow information in each of said nodes forming said new path;
setting a packet arriving at a leading end node, from which said new path and said old path that uses said node to be bypassed are branched, so as to be transmitted to both said new path and said old path; and
deleting thereafter said old path from said valid path memory.

31. The computer-readable recording medium according to claim 30, wherein said program causes said computer to execute the processing comprising:
in deleting said old path,
said controller sequentially deleting flows from said leading end node of said old path; and
said controller cancelling replication setting of a packet at said leading end, when deletion of said flows from said leading end node is completed.

32. The computer-readable recording medium according to claim 28,
wherein said program causes said computer to execute the processing comprising:
in case a node to be bypassed is specified,
establishing a tunnel path having, as a start point and an end point, at least two nodes neighboring to said node to be bypassed; and
creating and sets flow information for each of said nodes on said tunnel path,
as a result thereof, said node at said start point of said tunnel path, based on said flow information set by said controller, rewriting a transmission destination in a header of a packet that is received by said node at said start point of said tunnel and that is to be forwarded on a path that passes said node to be bypassed, to an address of said tunnel so that said packet is forwarded into said tunnel, said packet being forwarded through said tunnel, and said node at said end point of said tunnel, based on said flow information set by said controller, restoring said transmission destination of said header of said packet forwarded through said tunnel and received by said node at said end point of said tunnel to an original transmission destination to have said packet forwarded.

33. The computer-readable recording medium according to claim 32, wherein said program causes said computer to execute the processing comprising:
deleting said tunnel path created for bypassing, after path configuration information that uses said tunnel for bypassing is deleted, in case, after canceling bypassing, there exists no path configuration information that uses said bypass tunnel.

34. A non-transitory computer-readable recording medium storing therein a program that causes a computer that constitutes a controller exercising flow control for a plurality of nodes to execute the processing comprising:
removing a node commanded to be bypassed from topology information that prescribes a network configuration of said plurality nodes;
calculating a new path not passing said node commanded to be bypassed to store said new path calculated in a valid path memory;
creating flow information that prescribes operation, at each of nodes forming said new path, on an associated flow; and
setting said flow information in each of said nodes forming said new path, wherein said controller includes:
path configuration information, for each of nodes of respective points from said start point to said end point of each path, said path configuration information including:
identification information for each of said nodes; and
flow information that is to be set at each of said nodes, and said controller further includes:
a path management table used to manage said path configuration information, for each of said paths, said path management table including:
information of said nodes that form said path;
information of a packet header that serves as a trigger for said controller to create said path; and
pointer information that points to said path configuration information of a corresponding path, said program causing said computer to execute the processing comprising:
registering a packet header information, node information and a pointer to path configuration information.

35. The computer-readable recording medium according to claim 28, wherein said flow information at least includes:
a rule that is matched to a header of a packet received by said node; and
an action that prescribes operation including forwarding by said node of a packet that matches to said rule,
in case said header of said packet received by said node fails to match to said rule of said flow information, said node forwarding said packet to said controller, said program causing said computer to execute the processing comprising:
deciding on a flow of said packet received to set said flow information for said node on said flow; and
returning said packet to said node as a transmission source of said packet or to a node out of said nodes connected to said controller, said node being on a path on which said packet is transferred and which is closer to said node of a transmission destination of said packet than to said node of said transmission source of said packet.

36. A non-transitory computer-readable recording medium storing therein a program that causes a computer that constitutes a controller exercising flow control for a plurality of nodes to execute the processing comprising:
removing a node commanded to be bypassed from topology information that prescribes a network configuration of said plurality nodes;
calculating a new path not passing said node commanded to be bypassed to store said new path calculated in a valid path memory;
creating flow information that prescribes operation, at each of nodes forming said new path, on an associated flow; and
setting said flow information in each of said nodes forming said new path, wherein said controller includes:
a path cache that stores therein, as one cache entry, two termination points including a start point and an end point of a path, and a plurality of nodes on said path, as path information; and a path calculation unit that calculates a path, said program causing said computer to execute the processing comprising:

said path calculation unit, in calculating a path, specifying a start point and an end point to retrieve said path cache for a path having both ends coincident with said specified points; and if there is found such a path having both ends coincident with said specified points, said path calculation unit taking said path to be a calculated path, and if there is found no path having both ends coincident with said specified points, said controller calculates a path having both ends coincident with said specified points to store information on said path calculated in said path cache.

* * * * *